(12) United States Patent
Kubota et al.

(10) Patent No.: US 10,330,893 B2
(45) Date of Patent: Jun. 25, 2019

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Hisao Fukaya, Tochigi (JP)

(73) Assignee: KANTATSU CO., LTD., Tochigi (JP)

( * ) Notice: Subject to any disclaimer, the term of this patent is extended or adjusted under 35 U.S.C. 154(b) by 0 days.

(21) Appl. No.: 15/794,056

(22) Filed: Oct. 26, 2017

(65) Prior Publication Data

US 2018/0045920 A1  Feb. 15, 2018

Related U.S. Application Data

(63) Continuation of application No. 15/053,168, filed on Feb. 25, 2016, now Pat. No. 9,835,825.

(30) Foreign Application Priority Data

Jun. 8, 2015 (JP) ................................. 2015-115921

(51) Int. Cl.
*G02B 9/62* (2006.01)
*G02B 13/04* (2006.01)
*G02B 13/00* (2006.01)

(52) U.S. Cl.
CPC ........... *G02B 13/0045* (2013.01); *G02B 9/62* (2013.01)

(58) Field of Classification Search
CPC ........ G02B 13/00; G02B 13/04; G02B 13/18; G02B 21/02
USPC ................. 359/756–757, 752, 713, 658, 708
See application file for complete search history.

(56) References Cited

U.S. PATENT DOCUMENTS

| 9,417,434 | B1 | 8/2016 | Huang |
| 2012/0188654 | A1 | 7/2012 | Huang |
| 2013/0314804 | A1 | 11/2013 | Kubota et al. |
| 2013/0335834 | A1 | 12/2013 | Tsai et al. |
| 2014/0063616 | A1 | 3/2014 | Okano et al. |
| 2014/0218582 | A1 | 8/2014 | Chen et al. |
| 2014/0254029 | A1 | 9/2014 | Hsu et al. |

(Continued)

FOREIGN PATENT DOCUMENTS

| CN | 103576297 A | 2/2014 |
| CN | 104122652 A | 10/2014 |

(Continued)

*Primary Examiner* — Dawayne Pinkney
(74) *Attorney, Agent, or Firm* — Kubotera & Associates, LLC

(57) ABSTRACT

An imaging lens includes an aperture stop; a first lens having positive refractive power; a second lens having negative refractive power; a third lens; a fourth lens; a fifth lens having negative refractive power; and a sixth lens, arranged in this order from an object side to an image plane side. A surface of the first lens on the image plane side has a positive curvature radius. A surface of the third lens on the image plane side has a positive curvature radius. A surface of the fifth lens on the object side and a surface of the fifth lens on the image plane side have inflection points and are aspheric. A surface of the sixth lens on the object side has a positive curvature radius. The first to the third lenses have specific thicknesses so that specific conditional expressions are satisfied.

20 Claims, 18 Drawing Sheets

(56) References Cited

U.S. PATENT DOCUMENTS

| | | |
|---|---|---|
| 2014/0355134 A1* | 12/2014 | Sekine ............... G02B 13/0045 359/713 |
| 2015/0146092 A1 | 5/2015 | Chen |
| 2015/0160435 A1 | 6/2015 | Chen et al. |
| 2015/0241665 A1 | 8/2015 | Hashimoto |
| 2015/0253540 A1 | 9/2015 | Hsu et al. |
| 2015/0260953 A1 | 9/2015 | Ota et al. |
| 2015/0260954 A1 | 9/2015 | Ota et al. |
| 2015/0260961 A1 | 9/2015 | Ota et al. |
| 2015/0338607 A1 | 11/2015 | Liao et al. |
| 2015/0370042 A1 | 12/2015 | Chen et al. |
| 2016/0004038 A1 | 1/2016 | Huang |
| 2016/0085052 A1* | 3/2016 | Park ................... G02B 13/0045 359/713 |
| 2016/0116715 A1 | 4/2016 | Ota |
| 2016/0124189 A1 | 5/2016 | Park |
| 2016/0187619 A1 | 6/2016 | Tang et al. |
| 2016/0241756 A1 | 8/2016 | Chen |
| 2016/0341934 A1 | 11/2016 | Mercado |

FOREIGN PATENT DOCUMENTS

| | | |
|---|---|---|
| CN | 105807407 A | 7/2016 |
| JP | 2013-195587 A | 9/2013 |
| JP | 2014-013293 A | 1/2014 |
| TW | 201241470 A1 | 10/2012 |
| TW | 201331623 A1 | 8/2013 |

\* cited by examiner

IMAGING LENS

CROSS-REFERENCE TO RELATED APPLICATIONS

This is a continuation application of a prior application Ser. No. 15/053,168, filed on Feb. 25, 2016, allowed, which claims priority of Japanese Patent Application No. 2015-115921, filed on Jun. 8, 2015.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a cellular phone, a portable information terminal, or the like, a digital still camera, a security camera, a vehicle onboard camera, and a network camera.

In these years, in place of cellular phones that are intended mainly for making phone calls, so-called "smartphones", i.e., multifunctional cellular phones which can run various application software as well as a voice call function, have been more widely used. When application software is run on smartphones, it is possible to perform functions such as those of digital still cameras and car navigation systems on the smartphones. In order to perform those various functions, most models of smartphones include cameras.

Generally speaking, product groups of such smartphones are often composed according to specifications for beginners to advanced users. Among them, an imaging lens to be mounted in a product designed for the advanced users is required to have a high-resolution lens configuration so as to be also applicable to a high pixel count imaging element of these years, as well as a small size.

As a method of attaining the high-resolution imaging lens, there has been a method of increasing the number of lenses that compose the imaging lens. However, the increase of the number of lenses easily causes an increase in the size of the imaging lens. Therefore, the lens configuration having a large number of lenses has a disadvantage in terms of mounting in a small-sized camera such as the above-described smartphones. Accordingly, in development of the imaging lens, it has been necessary to focus on shortening a total track length, while attaining high resolution of the imaging lens.

However, with rapid advancement in achieving the higher pixel count of an imaging element and image processing technology in these days, an imaging lens has been developed so as to attain higher resolution rather than a shorter total track length of the imaging lens. There was also a recent attempt to attach a separate camera unit onto a smartphone, whereby it is possible to obtain images equivalent to those of digital still cameras.

In case of a lens configuration composed of six lenses, due to the large number of lenses of the imaging lens, it has high flexibility in design. In addition, it has potential to attain satisfactory correction of aberrations, which are necessary for high-resolution imaging lenses, and downsizing of the imaging lens in a balanced manner. For example, as the imaging lens having the six-lens configuration as described above, an imaging lens described in Patent Reference has been known.

Patent Reference: Japanese Patent Application Publication No. 2013-195587

The imaging lens described in Patent Reference includes a first lens that is positive and directs a convex surface thereof to an object side, a second lens that is negative and directs a concave surface thereof to an image plane side, a third lens that is negative and directs a concave surface thereof to the object side, a fourth and fifth lenses that are positive and direct convex surfaces thereof to the image plane side, and a sixth lens that is negative and directs a concave surface thereof to the object side. According to the conventional imaging lens of Patent Reference, by satisfying conditional expressions of a ratio between a focal length of the first lens and a focal length of the third lens and a ratio between a focal length of the second lens and a focal length of the whole lens system, it is achievable to satisfactorily correct a distortion and a chromatic aberration.

Each year, functions and sizes of cellular phones and smartphones are getting higher and smaller, and the level of a small size required for an imaging lens is even higher than before. In case of the imaging lens of Patent Reference, since a distance from an object-side surface of the first lens to an image plane of an imaging element is long, there is a limit by itself to achieve satisfactory correction of aberrations while downsizing the imaging lens to satisfy the above-described demands. It is achievable to reduce the level of downsizing required for an imaging lens by providing a camera as a separate unit from cellular phones or smartphones. However, in terms of convenience or portability, cellular phones or smartphones with built-in cameras are still dominantly preferred. Therefore, there remains such a strong demand for small imaging lenses with high resolution.

Here, such a problem is not specific to the imaging lens to be mounted in cellular phones and smartphones. Rather, it is a common problem even for an imaging lens to be mounted in a relatively small camera such as digital still cameras, portable information terminals, security cameras, vehicle onboard cameras, and network cameras.

In view of the above-described problems in conventional techniques, an object of the present invention is to provide an imaging lens that can attain both downsizing thereof and satisfactory aberration correction.

Further objects and advantages of the present invention will be apparent from the following description of the invention.

SUMMARY OF THE INVENTION

In order to attain the objects described above, according to a first aspect of the present invention, an imaging lens includes a first lens having positive refractive power; a second lens having negative refractive power; a third lens having positive refractive power, a fourth lens; a fifth lens; and a sixth lens, arranged in this order from an object side to an image plane side. The fifth lens is formed in a shape so that a surface thereof on the image plane side has a positive curvature radius.

According to the first aspect of the present invention, when the whole lens system has a focal length f, a composite focal length of the fifth lens and the sixth lens is f56, a distance along an optical axis between the first lens and the second lens is D12, and a distance along the optical axis between the second lens and the third lens is D23, the imaging lens of the present invention satisfies the following conditional expressions (1) through (4):

$$f56<0 \tag{1}$$

$$2<D23/D12<20 \tag{2}$$

$$0.3<(D12/f)\times 100<1.5 \tag{3}$$

$$2<(D23/f)\times 100<10 \tag{4}$$

When the imaging lens satisfies the conditional expression (1), it is achievable to satisfactorily correct a chromatic aberration and a distortion, while downsizing the imaging lens. In addition, when the imaging lens satisfies the conditional expression (1), it is also achievable to restrain an incident angle of a light beam emitted from the imaging lens into an imaging element within the range of a chief ray angle (CRA). As is well known, the chief ray angle (CRA) is set in advance for an imaging element, i.e., a range of an incident angle of a light beam that can be taken in the image plane. When a light beam outside the range of CRA enters the imaging element, "shading" occurs, which is an obstacle for achieving satisfactory image-forming performance.

When the value of the composite focal length f56 is outside the range of the conditional expression (1), the positive refractive powers of the first lens and the third lens are relatively weak. Therefore, although it is easy to restrain the incident angle of a light beam emitted from the imaging lens within the range of CRA, it is difficult to downsize the imaging lens. As for correction of aberrations, although it is advantageous to correct an axial chromatic aberration, the distortion increases in a negative direction and a chromatic aberration of magnification is insufficiently corrected (an image-forming point at a short wavelength moves in a direction to be close to the optical axis relative to an image-forming point at a reference wavelength). Therefore, it is difficult to obtain satisfactory imaging performance.

When the imaging lens satisfies the conditional expression (2), it is achievable to restrain the chromatic aberration, astigmatism, and the distortion respectively within preferred ranges in a balanced manner. When the value exceeds the upper limit of "20", the axial chromatic aberration is excessively corrected (a focal position at a short wavelength moves toward to the image plane side relative to a focal position at a reference wavelength). In addition, in a middle portion of an image, the chromatic aberration of magnification is excessively corrected (an image-forming point at a short wavelength moves in a direction to be away from the optical axis relative to an image-forming point at a reference wavelength). In addition, the distortion increases in the negative direction and a sagittal image surface curves to the object side. Therefore, it is difficult to obtain satisfactory imaging performance.

On the other hand, when the value is below the lower limit of "2", it is advantageous for correction of the chromatic aberration and the distortion. However, the astigmatic difference increases for an off-axis light flux. Therefore, it is difficult to obtain satisfactory imaging performance.

Here, in order to achieve downsizing of the imaging lens while satisfactorily correcting the aberrations, it is preferable to satisfy the conditional expressions (3) and (4), as well as the conditional expression (2).

According to a second aspect of the invention, when the whole lens system has a focal length f and a composite focal length of the first lens through the third lens is f123, the imaging lens having the above-described configuration preferably satisfies the following conditional expression (5):

$$0.5<f123/f<1.5 \tag{5}$$

When the imaging lens satisfies the conditional expression (5), it is achievable to restrain the chromatic aberration, the astigmatism, a field curvature, and the distortion within respective preferable ranges in a balanced manner. When the value exceeds the upper limit of "1.5", it is advantageous for correction of the axial chromatic aberration. However, the astigmatic difference increases, and the distortion increases in the positive direction, so that it is difficult to obtain satisfactory image-forming performance.

On the other hand, when the value is below the lower limit of "0.5", although it is advantageous for correcting the chromatic aberration of magnification, the distortion increases in the negative direction and the image-forming surface curves to the object side, so that the field curvature is insufficiently corrected. Therefore, it is difficult to obtain satisfactory image-forming performance.

According to the second aspect of the invention, the imaging lens having the above-described configuration preferably further satisfies the following conditional expression (5A):

$$0.7<f123/f<1.4 \tag{5A}$$

According to a third aspect of the invention, when the second lens has a focal length f2, and a composite focal length of the first lens through the third lens is f123, the imaging lens having the above-described configuration preferably satisfies the following conditional expression (6):

$$-1.7<f2/f123<-0.7 \tag{6}$$

When the imaging lens satisfies the conditional expression (6), it is achievable to satisfactorily correct the chromatic aberration, the astigmatism, and the field curvature. When the value exceeds the upper limit of "−0.7", the both axial chromatic aberration and the chromatic aberration of magnification are excessively corrected. In addition, in the astigmatism, a sagittal image surface tilts to the image plane side, and the astigmatic difference increases. Moreover, periphery of the image-forming surface curves to the image plane side, so that the field curvature is excessively corrected. Therefore, it is difficult to obtain satisfactory image-forming performance.

On the other hand, when the value is below the lower limit of "−1.7", although it is advantageous for correcting the chromatic aberration of magnification, the axial chromatic aberration is insufficiently corrected (a focal position at a short wavelength moves to the object side relative to a focal point at a reference wavelength). In addition, in the astigmatism, a sagittal image surface curves to the object side and the astigmatic difference increases. Moreover, the periphery of the image-forming surface curves to the object side. Also in this case, it is difficult to obtain satisfactory image-forming performance.

According to a fourth aspect of the invention, when the second lens has a focal length f2 and the third lens has a focal length f3, the imaging lens having the above-described configuration preferably satisfies the following conditional expression (7):

$$-1.3<f2/f3<-0.3 \tag{7}$$

When the imaging lens satisfies the conditional expression (7), it is possible to satisfactorily correct the chromatic aberration, the astigmatism, the distortion, and a coma aberration, while downsizing the imaging lens. When the value exceeds the upper limit of "−0.3", although it is advantageous for downsizing of the imaging lens, in the astigmatism, a sagittal image surface curves to the object side and the astigmatic difference increases. In addition, inner coma aberration increases for the off-axis light flux, so that it is difficult to obtain satisfactory image-forming performance.

On the other hand, when the value is below the lower limit of "−1.3", a back focal length increases, so that it is difficult to downsize the imaging lens. In addition, the distortion increases in the negative direction and the astigmatism increases. In the off-axis light flux, an outer coma aberration is generated. For this reason, it is difficult to obtain satisfactory image-forming performance.

According to a fifth aspect of the invention, when the whole lens system has a focal length f and the third lens has a focal length f3, the imaging lens having the above-described configuration preferably satisfies the following conditional expression (8):

$$0.5 < f3/f < 3.0 \tag{8}$$

When the imaging lens satisfies the conditional expression (8), it is achievable to restrain the chromatic aberration, the distortion, the coma aberration, and the astigmatism within satisfactory ranges in a balanced manner. When the value exceeds the upper limit of "3.0", it is advantageous for downsizing of the imaging lens and correction of the axial chromatic aberration. However, the distortion increases in the positive direction and in the astigmatism, the sagittal image surface tilts to the image plane side, and the astigmatic difference increases. Therefore, it is difficult to obtain satisfactory image-forming performance.

On the other hand, when the value is below the lower limit of "0.5", it is difficult to downsize the imaging lens and it is also difficult to correct the distortion, the astigmatism, the field curvature, and the coma aberration, so that it is difficult to obtain satisfactory image-forming performance. More specifically, the distortion increases in the negative direction and in the astigmatism, a sagittal image surface curves towards the object side, and the astigmatic difference increases. Moreover, the periphery of the image-forming surface curves to the object side and the field curvature is insufficiently corrected. In addition, the outer coma aberration also increases.

According to the fifth aspect of the invention, the imaging lens having the above-described configuration preferably further satisfies the following conditional expression (8A).

$$0.5 < f3/f < 2.5 \tag{8A}$$

According to a sixth aspect of the invention, when the third lens has a focal length f3 and the fourth lens has a focal length f4, the imaging lens having the above-described configuration preferably satisfies the following conditional expression (9):

$$-1.0 < f3/f4 < -0.01 \tag{9}$$

When the imaging lens satisfies the conditional expression (9), it is achievable to satisfactorily correct the astigmatism, the chromatic aberration, and the distortion, while downsizing the imaging lens. When the value exceeds the upper limit of "−0.01", although it is advantageous for downsizing of the imaging lens, it is difficult to secure the back focal length. Moreover, the axial chromatic aberration and the chromatic aberration of magnification are excessively corrected, so that it is difficult to obtain satisfactory image-forming performance.

On the other hand, when the value is below the lower limit of "−1.0", although it is easy to correct the axial chromatic aberration, the chromatic aberration of magnification is insufficiently corrected. In addition, in the astigmatism, the sagittal image surface tilts towards the object side and the astigmatic difference increases. Moreover, the field curvature is insufficiently corrected. The distortion increases in the negative direction. For this reason, it is difficult to obtain satisfactory image-forming performance.

According to a seventh aspect of the invention, when the first lens has an object-side surface having positive curvature radius and an image plane-side surface having curvature radius R1r, and the whole lens system has a focal length f, the imaging lens preferably satisfies the following conditional expression (10):

$$3.0 < |R1r|/f \tag{10}$$

When the imaging lens satisfies the conditional expression (10), it is achievable to satisfactorily correct the astigmatism and the coma aberration. When the value of the conditional expression is less than 3.0, the back focal length increases, so that it is difficult to downsize the imaging lens. Moreover, the astigmatic difference increases and the outer coma aberration increases for the off-axial light flux. Therefore, it is difficult to obtain satisfactory image-forming performance.

According to an eighth aspect of the invention, when the second lens has an object-side surface having a negative curvature radius and an image plane-side surface having a positive curvature radius, the curvature radius of the object-side surface of the second lens is R2f, and the curvature radius of the image plane-side surface of the second lens is R2r, the second lens of the imaging lens having the above-described configuration preferably satisfies the following conditional expression (11):

$$-100 < R2f/R2r \tag{11}$$

According to the imaging lens of the invention, the second lens is preferably formed in a shape, such that the curvature radius of the object-side surface is negative and the curvature radius of the image plane-side surface is positive, so as to form a shape of a biconcave lens. In addition, when the second lens is formed into such shape, it is preferable that the second lens further satisfies the above conditional expression (11). When the second lens satisfies the conditional expression (11), it is achievable to define the outer shape of the second lens near the optical axis and to satisfactorily correct the astigmatism and the distortion. When the value is outside the range of the conditional expression (11), the distortion increases in the negative direction. In addition, in the astigmatism, the periphery of the tangential image surface curves to the image plane side, and the astigmatic difference increases. Therefore, it is difficult to obtain satisfactory image-forming performance.

According to a ninth aspect of the invention, when the third lens is formed in a shape such that a curvature radius of an object-side surface thereof is R3f and a curvature radius of an image planeside thereof is R3r, the imaging lens having the above-described configuration preferably satisfies the following conditional expression (12):

$$-2.0 < R3f/R3r < 0.6 \tag{12}$$

When the imaging lens satisfies the conditional expression (12), it is achievable to satisfactorily correct the distortion, the astigmatism, the field curvature, and the coma aberration. When the value exceeds the upper limit of "0.6", the distortion increases in the negative direction, and in the astigmatism, a sagittal image surface curves to the object side. Moreover, the field curvature is insufficiently corrected and the outer coma aberration increases relative to the off-axis light flux. Therefore, it is difficult to obtain satisfactory image-forming performance.

On the other hand, when the value is below the lower limit of "−2.0", although it is advantageous for correction of the distortion, the astigmatic difference and the coma aberration increase. Therefore, also in this case, it is difficult to obtain satisfactory image-forming performance.

Here, according to the invention, the shapes of the lenses are specified, using the positive/negative signs of the curvature radiuses thereof. The signs of the curvature radii are determined according to the definition, i.e. a curvature radius is positive when a center of the curvature radius is on an image plane side when viewed from the lens surface and the curvature radius is negative when the center of a curvature radius is on the object side. Therefore, "an object-side surface having positive curvature radius" means that a surface on the object side is a convex surface, and "an object-side surface having negative curvature radius" means that an object-side surface is a concave surface. Moreover, "an image plane-side surface having a positive curvature radius" means that a surface on the image plane side is a concave surface, and "an image plane-side surface having a negative curvature radius" means that an image plane-side surface is a convex surface. Here, the curvature radii herein mean paraxial curvature radii. Therefore, in some cases, such curvature may not fit to a general shape of a lens in a sectional view of the lens.

According to a tenth aspect of the invention, when the second lens has Abbe's number vd2 and the third lens has Abbe's number vd3, the imaging lens of the invention preferably satisfies the following conditional expressions (13) and (14):

$$15 < vd2 < 35 \quad (13)$$

$$40 < vd3 < 75 \quad (14)$$

When the imaging lens satisfies the conditional expressions (13) and (14), it is achievable to satisfactorily correct the chromatic aberration. According to the imaging lens of the invention, the second lens has negative refractive power and the third lens has positive refractive power. As shown in the conditional expressions (13) and (14), when the negative lens is made from a high-dispersion material and the positive lens is made from a low-dispersion material, it is achievable to satisfactorily correct the chromatic aberration. In the conditional expression (13), when the value exceeds the upper limit of "35", the axial chromatic aberration and the chromatic aberration of magnification are both insufficiently corrected. On the other hand, when the value is below the lower limit of "15", the axial chromatic aberration and the chromatic aberration of magnification are both excessively corrected. Moreover, in the conditional expression (14), when the value exceeds the upper limit of "75", the axial chromatic aberration and the chromatic aberration of magnification are both excessively corrected. When the value is below the lower limit of "40", the axial chromatic aberration and the chromatic aberration of magnification are both insufficiently corrected. Therefore, in either case, it is difficult to obtain satisfactory image-forming performance.

According to an eleventh aspect of the invention, when the sixth lens has Abbe's number vd6, the imaging lens of the invention preferably satisfies the following conditional expression (15):

$$40 < vd6 < 75 \quad (15)$$

When the imaging lens satisfies the conditional expression (15), it is achievable to satisfactorily correct the chromatic aberration. When the value exceeds the upper limit of "75", although it is advantageous for correcting the axial chromatic aberration, the difference between the best image surfaces at each wavelength is large, and it is difficult to obtain satisfactory image-forming performance.

On the other hand, when the value is below the lower limit of "40", the axial chromatic aberration and the chromatic aberration of magnification are both excessively corrected and it is difficult to obtain satisfactory image-forming performance.

According to a twelfth aspect of the invention, when a distance along the optical axis between the third lens and the fourth lens is D34 and a distance along the optical axis between the fourth lens and the fifth lens is D45, the imaging lens of the invention preferably satisfies the following conditional expression (16):

$$0.2 < D34/D45 < 2.0 \quad (16)$$

When the imaging lens satisfies the conditional expression (16), it is achievable to satisfactorily correct the chromatic aberration, the distortion, and the coma aberration, while restraining the incident angle of a light beam emitted from the imaging lens within the range of CRA. When the value exceeds the upper limit of "2.0", the axial chromatic aberration and the chromatic aberration of magnification are both excessively corrected, and the distortion increases in the positive direction. Moreover, the inner coma aberration increases for the off-axis light flux, so that it is difficult to obtain satisfactory image-forming performance.

On the other hand, when the value is below the lower limit of "0.2", although it is advantageous for correction of the chromatic aberration, the distortion increases in the negative direction. In addition, the outer coma aberration of the off-axis light flux increases. Therefore, it is difficult to obtain satisfactory image-forming performance.

According to the twelfth aspect of the invention, the imaging lens having the above-described configuration preferably further satisfies the following conditional expression (16A):

$$0.3 < D34/D45 < 1.5 \quad (16A)$$

According to a thirteenth aspect of the invention, when the fourth lens has negative refractive power and has Abbe's number vd4, the imaging lens having the above-described configuration preferably satisfies the following conditional expression (17):

$$40 < vd4 < 75 \quad (17)$$

According to the imaging lens of the invention, the refractive powers of the first lens through the third lens are arranged in the order of positive, negative, positive from the object side. When the fourth lens has negative refractive power, the refractive powers are arranged in the order of positive, negative, positive, and negative from the first lens through the fourth lens from the object side. Such a lens arrangement, in which positive refractive power and negative refractive power are alternately arranged, is very effective lens configuration for restraining the Petzval sum.

When the imaging lens satisfies the conditional expression (17), it is achievable to satisfactorily correct the chromatic aberration. When the value exceeds the upper limit of "75", although it is advantageous for correcting the axial chromatic aberration, the chromatic aberration of magnification is excessively corrected, and it is difficult to obtain satisfactory image-forming performance.

On the other hand, when the value is below the lower limit of "40", the axial chromatic aberration is excessively corrected and the chromatic aberration of magnification is insufficiently corrected. Therefore, it is difficult to obtain satisfactory image-forming performance.

According to a fourteenth aspect of the invention, when the sixth lens has negative refractive power and has a focal length f6, and a composite focal length of the fourth lens and the fifth lens is f45, the imaging lens having the above-described configuration preferably satisfies the following conditional expression (18):

$$2.5<f45/f6<7 \qquad (18)$$

When the imaging lens satisfies the conditional expression (18), it is achievable to satisfactorily correct the chromatic aberration and the distortion, while downsizing the imaging lens. In addition, when the imaging lens satisfies the conditional expression (18), it is also possible to restrain the incident angle of a light beam emitted from the imaging lens within the range of CRA. When the value exceeds the upper limit of "7", although it is easy to restrain the incident angle of a light beam emitted from the imaging lens within the CRA range, it is difficult to downsize the imaging lens.

On the other hand, when the value is below the lower limit of "2.5", although it is advantageous for downsizing of the imaging lens, the distortion increases in the positive direction and the chromatic aberration of magnification is excessively corrected. Therefore, it is difficult to obtain satisfactory image-forming performance. In addition, it is also difficult to restrain the incident angle of a light beam emitted from the imaging lens within the range of CRA.

According to a fifteenth aspect of the invention, when the sixth lens has positive refractive power and has a focal length f6, and a composite focal length of the fourth lens and the fifth lens is f45, the imaging lens having the above-described configuration preferably satisfies the following conditional expression (19):

$$-0.5<f45/f6<-0.1 \qquad (19)$$

When the imaging lens satisfies the conditional expression (19), it is possible to satisfactorily correct the distortion, while downsizing the imaging lens. In addition, when the imaging lens satisfies the conditional expression (19), it is also possible to restrain the incident angle of a light beam emitted from the imaging lens within the range of CRA. When the value exceeds the upper limit of "−0.1", although it is advantageous for downsizing of the imaging lens, it is difficult to restrain the incident angle of a light beam emitted from the imaging lens within the range of CRA.

On the other hand, when the value is below the lower limit of "−0.5", although it is easy to restrain the incident angle of a light beam emitted from the imaging lens within the range of CRA, it is difficult to downsize the imaging lens. In addition, the distortion increases in the negative direction and it is difficult to obtain satisfactory image-forming performance.

According to the imaging lens of the present invention, it is possible to provide the small-sized imaging lens that is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13, and 16 are schematic sectional views of the imaging lenses in Numerical Data Examples 1 to 6 according to the embodiment, respectively. Since the imaging lenses in those Numerical Data Examples have the same basic configuration, the lens configuration of the embodiment will be described with reference to the illustrative sectional view of Numerical Data Example 1.

Figure 1:
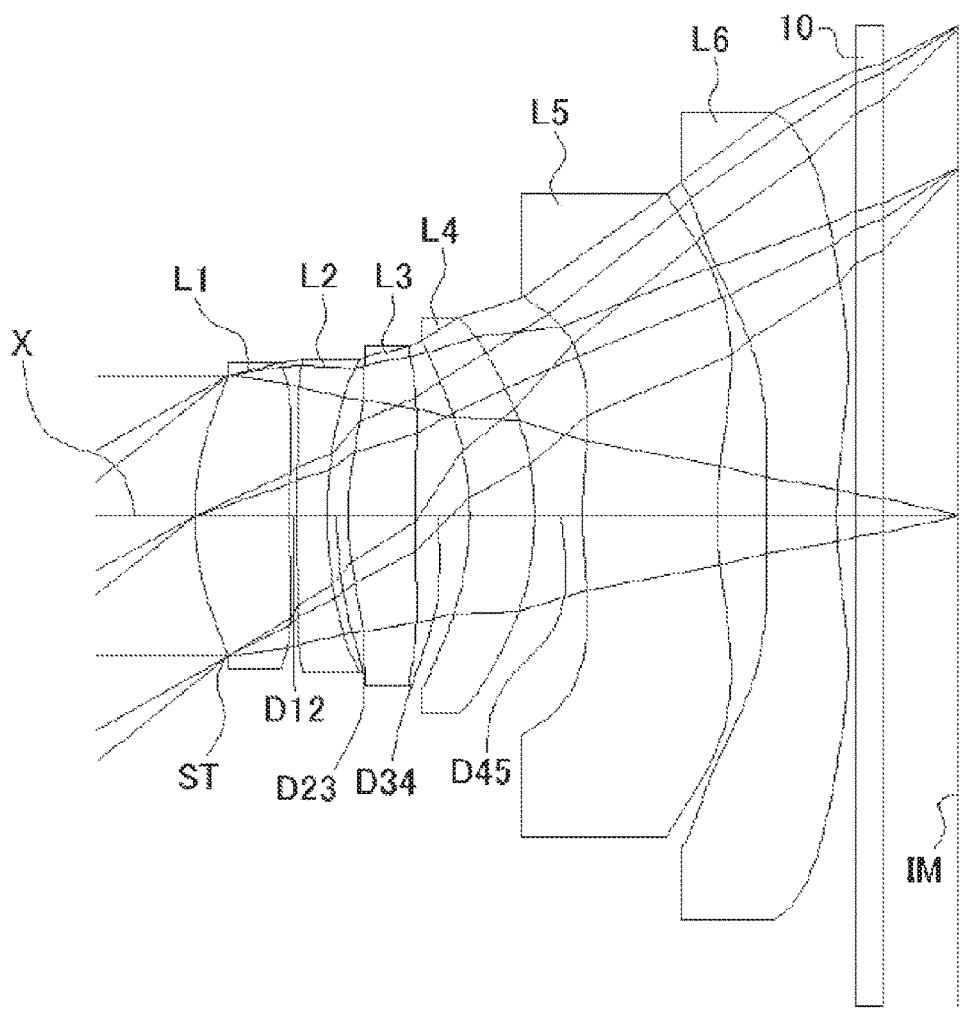
FIG. 1 shows a sectional view of a schematic configuration of an imaging lens in Numerical Data Example 1 according to an embodiment of the present invention.

As shown in FIG. 1, according to the embodiment, the imaging lens includes a first lens L1 having positive refractive power, a second lens L2 having negative refractive power, a third lens L3 having positive refractive power, a fourth lens L4 having negative refractive power, a fifth lens L5 having negative refractive power, and a sixth lens L6, arranged in the order from an object side to an image plane side. Between the sixth lens L6 and an image plane IM of an imaging element, there is provided a filter 10. The filter 10 is omissible.

According to Numerical Data Example 1, the sixth lens L6 has negative refractive power. However, the refractive power of the sixth lens L6 may not be limited to negative. The refractive power of the sixth lens L6 can be positive or zero as long as a composite focal length of the fifth lens L5 and a focal length of the sixth lens L6 is negative. The imaging lens of Numerical Data Example 5 is an example, in which the sixth lens L6 has positive refractive power.

The first lens L1 is formed in a shape such that a curvature radius r1 of an object-side surface thereof and a curvature radius r2 of an image plane-side surface thereof are both positive, so as to have a shape of a meniscus lens directing a convex surface thereof to the object side near an optical axis X. The shape of the first lens L1 is not limited to the one in Numerical Data Example 1. The first lens L1 can be formed in any shape, as long as the curvature radius r1 of the object-side surface thereof is positive. More specifically, the first lens L1 of Numerical Data Example 4 is an example, in which the first lens L1 has negative curvature radius r2, i.e., a shape of a biconvex lens near the optical axis X.

Here, as described above, the first lens L1 can be formed in a shape of either meniscus lens directing a convex surface thereof to the object side or a shape of a biconvex lens near the optical axis X. Preferably, the first lens L1 is formed in a shape, such that a curvature radius $R1f$ (=r1) of an object-side surface thereof and a curvature radius $R1r$ (=r2) of an image plane-side surface thereof satisfy the following conditional expression:

$$0 < |R1f/R1r| < 0.15$$

Here, in the imaging lens according to the embodiment, for a purpose of improving ease in assembling of the imaging lens, an aperture stop ST is provided on the object side of the first lens L1. The position of the aperture stop ST is not limited to the one described in Numerical Data Example 1. For example, if the aperture stop ST is provided between the first lens L1 and the second lens L2, the presence of the imaging lens in a camera is emphasized. Therefore, it is possible to appeal to users by the luxurious impression, high lens performance, etc. as a part of design of the camera.

The second lens L2 is formed in a shape such that a curvature radius r3 of an object-side surface thereof is negative and a curvature radius r4 of an image plane-side surface thereof is positive, so as to have a shape of a biconcave lens near the optical axis X. The shape of the second lens L2 is not limited to the one in Numerical Data Example 1. The second lens L2 can be formed in any shape, as long as the curvature radius r4 of the image plane-side surface thereof is positive.

The third lens L3 is formed in a shape such that a curvature radius r5 of an object-side surface thereof and a curvature radius r6 of an image plane-side surface thereof are both positive, so as to have a shape of a meniscus lens directing a convex surface thereof to the object side near the optical axis X. The third lens L3 may be also formed in a shape of biconvex lens near the optical axis X. The third lens L3 of Numerical Data Example 4 is an example, in which the third lens L3 is formed in a shape of a biconvex lens near the optical axis X.

The fourth lens L4 is formed in a shape such that a curvature radius r7 of an object-side surface thereof and a curvature radius r8 of an image plane-side surface thereof are both negative, so as to have a shape of a meniscus lens directing a concave surface thereof to the object side near the optical axis X. The shape of the fourth lens L4 is not limited to the one in Numerical Data Example 1. For example, the fourth lens L4 can be formed in a shape of a biconcave lens near the optical axis X. The fourth lens L4 of Numerical Data Example 4 is an example, in which the fourth lens L4 is formed in a shape of a biconcave lens near the optical axis X.

The fifth lens L5 is formed in a shape such that a curvature radius r9 of an object-side surface thereof and a curvature radius r10 of an image plane-side surface thereof are both positive, so as to have a shape of a meniscus lens directing a convex surface thereof to the object side near the optical axis X. The fifth lens L5 can be formed in any shape as long as the curvature radius r10 of an image plane-side surface thereof is positive, and can be also formed in a shape of a biconcave lens near the optical axis X.

Here, according to the embodiment, the fifth lens L5 may be preferably formed from a material that satisfies the following conditional expression. The fifth lenses in Numerical Data Examples 1 to 5 are made of materials that satisfy the following conditional expression:

$$15 < vd5 < 35$$

The sixth lens L6 is formed in a shape such that a curvature radius r11 of an object-side surface thereof and a curvature radius r12 of an image plane-side surface thereof are both positive, so as to have a shape of a meniscus lens directing a convex surface thereof to the object side near the optical axis X. The shape of the sixth lens L6 is not limited to the one in Numerical Data Example 1, and can be a shape of a meniscus lens directing a concave surface thereof to the object side near the optical axis X, or can be a shape of biconcave lens. The sixth lens L6 of Numerical Data Example 4 is an example, in which the sixth lens L6 is formed in a shape of a biconcave lens near the optical axis X.

In the fifth lens L5 and the sixth lens L6, object-side surfaces and the image plane-side surfaces thereof are both formed as aspheric shapes having inflexion points. With such shapes of the fifth lens L5 and the sixth lens L6, it is achievable to satisfactorily correct an off-axis chromatic aberration of magnification as well as an axial chromatic aberration. In addition, it is also achievable to suitably restrain an incident angle of a light beam emitted from the imaging lens to the image plane IM within the range of CRA.

According to the embodiment, the imaging lens satisfies the following conditional expressions (1) through (17):

$$f56 < 0 \tag{1}$$

$$2 < D23/D12 < 20 \tag{2}$$

$$0.3 < (D12/f) \times 100 < 1.5 \tag{3}$$

$$2 < (D23/f) \times 100 < 10 \tag{4}$$

$$0.5 < f123/f < 1.5 \tag{5}$$

$$-1.7 < f2/f123 < -0.7 \tag{6}$$

$$-1.3 < f2/f3 < -0.3 \tag{7}$$

$$0.5 < f3/f < 3.0 \tag{8}$$

$$-1.0 < f3/f4 < -0.01 \tag{9}$$

$$3.0 < 1|R1r1|/f \tag{10}$$

$$-100 < R2f/R2r \tag{11}$$

$$-2.0 < R3f/R3r < 0.6 \tag{12}$$

$$15 < vd2 < 35 \quad (13)$$

$$40 < vd3 < 75 \quad (14)$$

$$40 < vd6 < 75 \quad (15)$$

$$0.2 < D34/D45 < 2.0 \quad (16)$$

$$40 < vd4 < 75 \quad (17)$$

In the above conditional expressions:
f: Focal length of a whole lens system
f2: Focal length of the second lens L2
f3: Focal length of the third lens L3
f4: Focal length of the fourth lens L4
f123: Composite focal length from the first lens L1 through the third lens L3
f56: Composite focal length of the fifth lens L5 and the sixth lens L6
R1r: Curvature radius of an image plane-side surface of the first lens L1 (=r2)
R2f: Curvature radius of an object-side surface of the second lens L2 (=r3)
R2r: Curvature radius of an image plane-side surface of the second lens L2 (=r4)
R3f: Curvature radius of an object-side surface of the third lens L3 (=r5)
R3r: Curvature radius of an image plane-side surface of the third lens L3 (=r6)
vd2: Abbe's number of the second lens L2
vd3: Abbe's number of the third lens L3
vd4: Abbe's number of the fourth lens L4
vd6: Abbe's number of the sixth lens L6
D12: Distance on the optical axis X between the first lens L1 and the second lens L2
D23: Distance on the optical axis X between the second lens L2 and the third lens L3
D34: Distance on the optical axis X between the third lens L3 and the fourth lens L4
D45: Distance on the optical axis X between the fourth lens L4 and the fifth lens L5

According to the embodiment, the imaging lens further satisfies the following conditional expressions (5A), (8A), and (16A):

$$0.7 < f123/f < 1.4 \quad (5A)$$

$$0.5 < f3/f < 2.5 \quad (8A)$$

$$0.3 < D34/D45 < 1.5 \quad (16A)$$

Furthermore, according to the embodiment, the imaging lens satisfies the following conditional expression (18) or (19) according to plus/minus sign of the focal length of the sixth lens L6. More specifically, the imaging lens of Numerical Data Examples 1 through 4 and 6 satisfy the conditional expression (18) and the imaging lens of Numerical Data Example 5 satisfies the conditional expression (19):

$$2.5 < f45/f6 < 7 \quad (18)$$

$$-0.5 < f45/f6 < -0.1 \quad (19)$$

In the above expressions,
f6: Focal length of the sixth lens L6
f45: Composite focal length of the fourth lens L4 and the fifth lens L5

Here, it is not necessary to satisfy all of the conditional expressions, and it is achievable to obtain an effect corresponding to the respective conditional expression when any single one of the conditional expressions is individually satisfied.

Any lenses that compose the imaging lens of the embodiment are made of plastic materials. Since a plastic material is lightweight and inexpensive, in these years, plastic materials have been used as lens materials of imaging lenses to be mounted in portable devices such as smartphones. A molding process of plastic lenses typically includes a step of pouring molten plastic material in a mold (die). Therefore, in order to mold into a desired lens shape, flowability of the plastic material is very important.

For this reason, in order to achieve both downsizing of the imaging lens and satisfactory correction of aberrations, while securing the flowability upon molding lenses, the imaging lens of the embodiment satisfies the following conditional expressions:

$$3.0 < T1/T2 < 4.0$$

$$0.15 < T2/T3 < 0.6$$

$$0.7 < T3/T4 < 4.5$$

$$0.6 < T5/T6 < 2.0$$

In the above formulae,
T1: Thickness of the first lens L1 on the optical axis
T2: Thickness of the second lens L2 on the optical axis
T3: Thickness of the third lens L3 on the optical axis
T4: Thickness of the fourth lens L4 on the optical axis
T5: Thickness of the fifth lens L5 on the optical axis
T6: Thickness of the sixth lens L6 on the optical axis In the embodiment, all lens surfaces are formed as an aspheric surface. The aspheric shapes of the lens surfaces are expressed by the following formula 1:

$$Z = \frac{C \cdot H^2}{1 + \sqrt{1 - (1+k) \cdot C^2 \cdot H^2}} + \sum (An \cdot H^n) \quad \text{[Formula 1]}$$

In the above formula,
Z: Distance in a direction of the optical axis
H: Distance from the optical axis in a direction perpendicular to the optical axis
C: Paraxial curvature (=1/r, r: paraxial curvature radius)
k: Conic constant
An: The nth order aspheric coefficient Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index, and vd represents an Abbe's number, respectively. Here, aspheric surfaces are indicated with surface numbers i affixed with * (asterisk).

Numerical Data Example 1

Basic Lens Data

TABLE 1 f = 4.84 mm Fno = 2.2 ω = 38.8°

| | i | r | d | nd | vd | [mm] |
|---|---|---|---|---|---|---|
| | | ∞ | ∞ | | | |
| L1 | 1*(ST) | 2.147 | 0.750 | 1.5346 | 56.1 | f1 = 4.175 |
| | 2* | 49.288 | 0.050 | (=D12) | | |
| L2 | 3* | −252.142 | 0.238 | 1.6355 | 23.9 | f2 = −4.897 |
| | 4* | 3.152 | 0.169 | (=D23) | | |
| L3 | 5* | 2.624 | 0.525 | 1.5346 | 56.1 | f3 = 5.350 |
| | 6* | 29.514 | 0.417 | (=D34) | | |
| L4 | 7* | −2.678 | 0.514 | 1.5346 | 56.1 | f4 = −104.564 |
| | 8* | −3.001 | 0.378 | (=D45) | | |
| L5 | 9* | 4.012 | 1.058 | 1.6355 | 23.9 | f5 = −99.984 |
| | 10* | 3.387 | 0.372 | | | |
| L6 | 11* | 12.192 | 0.561 | 1.5346 | 56.1 | f6 = −9.149 |
| | 12* | 3.435 | 0.150 | | | |
| | 13 | ∞ | 0.210 | 1.5168 | 64.2 | |
| | 14 | ∞ | 0.591 | | | |
| (IM) | | ∞ | | | | | f45 = −46.663
f56 = −9.167
f123 = 4.478

TABLE 2

Aspheric surface data

| i | k | A4 | A6 | A8 | A10 | A12 | A14 | A16 |
|---|---|---|---|---|---|---|---|---|
| 1 | 0 | −6.651E−03 | 2.384E−03 | −1.981E−02 | 6.320E−03 | 2.116E−03 | −3.372E−03 | 4.456E−04 |
| 2 | 0 | 1.570E−01 | −4.937E−01 | 5.793E−01 | −3.660E−01 | 1.020E−01 | 2.016E−03 | −5.193E−03 |
| 3 | 0 | 1.686E−01 | −4.813E−01 | 6.120E−01 | −3.522E−01 | 5.060E−02 | 3.578E−02 | −1.220E−02 |
| 4 | 0 | −5.766E−03 | −9.325E−02 | 1.702E−01 | −8.656E−02 | −8.893E−03 | 2.077E−02 | −4.651E−03 |
| 5 | 0 | −4.676E−02 | −5.403E−02 | 6.893E−02 | −7.953E−02 | 4.879E−02 | −1.631E−02 | 3.618E−03 |
| 6 | 0 | 5.094E−03 | −1.147E−02 | −3.057E−02 | 1.582E−02 | −1.131E−03 | −3.552E−04 | 5.587E−04 |
| 7 | 0 | −3.051E−02 | 4.035E−02 | −2.156E−02 | 1.693E−03 | 1.442E−03 | 2.680E−03 | −1.390E−03 |
| 8 | 0 | −1.234E−01 | 1.093E−01 | −6.345E−02 | 2.248E−02 | 1.499E−04 | −2.408E−03 | 3.863E−04 |
| 9 | 0 | −1.406E−01 | 6.219E−02 | −3.536E−02 | 1.057E−02 | 7.226E−04 | −1.522E−03 | 2.746E−04 |
| 10 | 0 | −6.282E−02 | 4.731E−03 | 1.110E−04 | −1.409E−04 | 1.992E−05 | 3.762E−07 | −1.462E−07 |
| 11 | 0 | −8.159E−02 | 1.341E−02 | −1.271E−04 | −1.035E−04 | 1.235E−06 | 8.329E−07 | −6.214E−08 |
| 12 | 0 | −8.376E−02 | 1.603E−02 | −1.408E−03 | 8.565E−06 | 4.676E−06 | −8.489E−09 | −1.595E−08 |

The values of the respective conditional expressions are as follows:

D23/D12=3.38

(D12/f)×100=1.03

(D23/f)×100=3.49 f123/f=0.93 f2/f123=−1.09 f2/f3=−0.92 f3/f=1.11 f3/f4=−0.05

|R1r|/f=10.18

R2f/R2r=−79.99

R3f/R3r=0.09

D34/D45=1.10 f45/f6=5.10

T1/T2=3.15

T2/T3=0.45

T3/T4=1.02

T5/T6=1.89

Accordingly, the imaging lens of Numerical Data Example 1 satisfies the above-described conditional expressions. The distance on the optical axis X from the object-side surface of the first lens L1 to the image plane IM (air-conversion length for the filter 10) is 5.91 mm, and downsizing of the imaging lens is attained.

Figure 2:
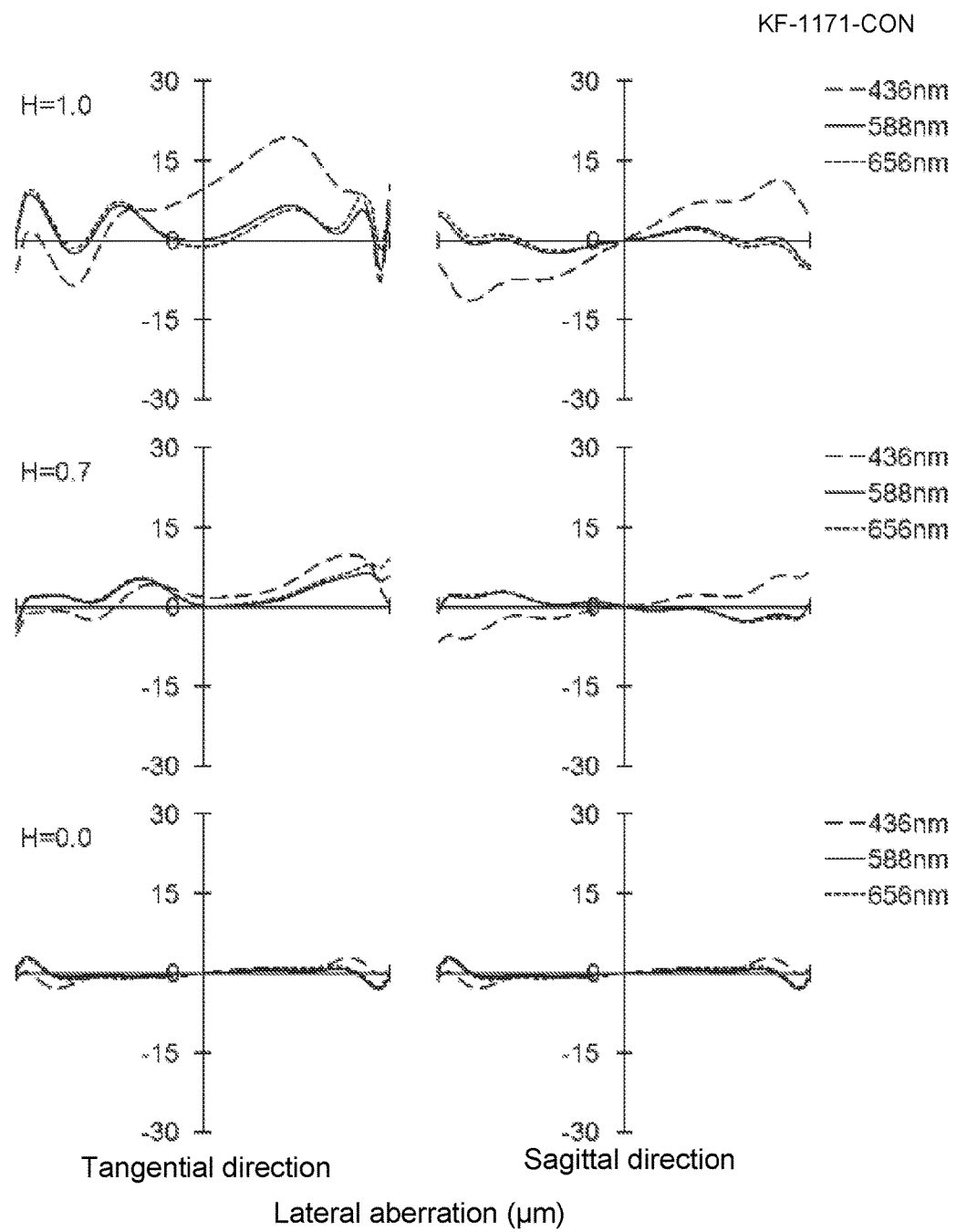
FIG. 2 is an aberration diagram showing a lateral aberration of the imaging lens of FIG. 1.
Figure 3:
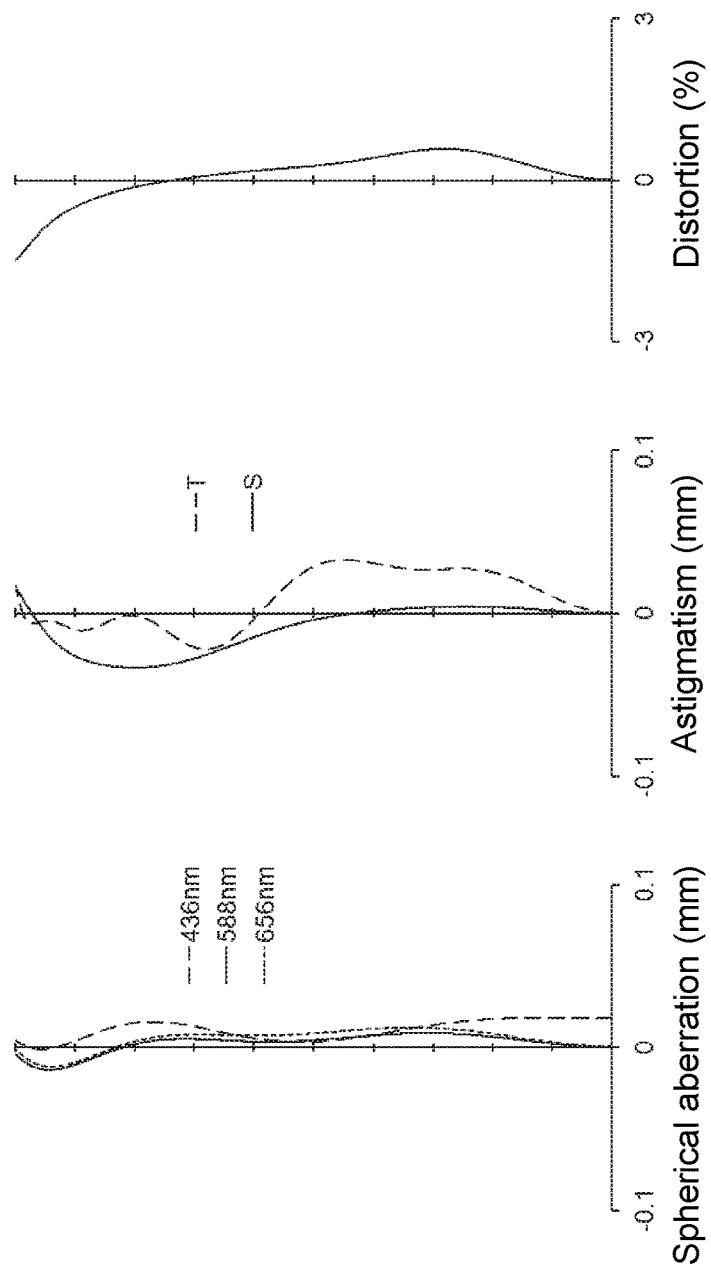
FIG. 3 is an aberration diagram showing a spherical aberration, astigmatism, and a distortion of the imaging lens of FIG. 1.
Figure 4:
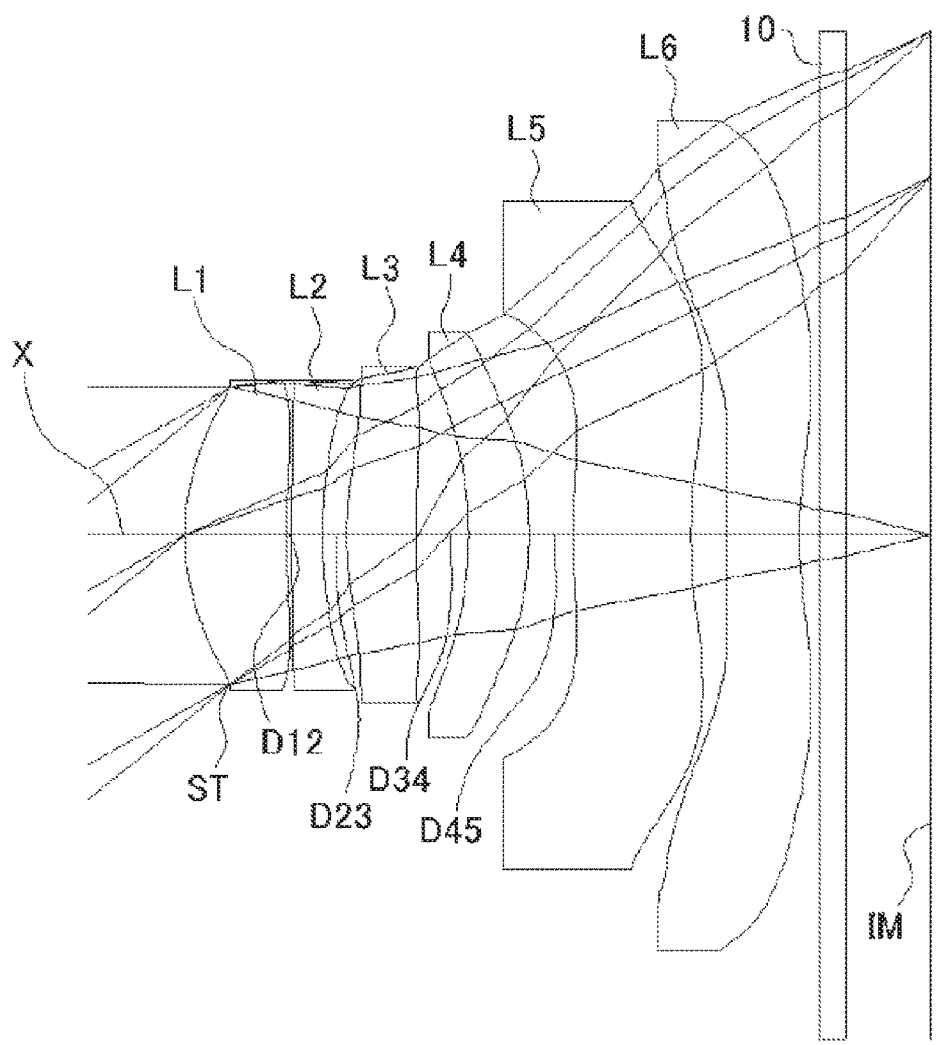
FIG. 4 shows a sectional view of a schematic configuration of an imaging lens in Numerical Data Example 2 according to the embodiment of the present invention.

FIG. 2 shows a lateral aberration that corresponds to a ratio H of each image height to the maximum image height (hereinafter referred to as "image height ratio H"), which is divided into a tangential direction and a sagittal direction (The same is true for FIGS. 5, 8, 11, 14, and 17). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, 15, and 18). As shown in FIGS. 2 and 3, according to the imaging lens of Numerical Data Example 1, the aberrations are satisfactorily corrected.

Numerical Data Example 2

Basic Lens Data

TABLE 3 f = 4.75 mm Fno = 2.1 ω = 39.3°

| | i | r | d | nd | vd | [mm] |
|---|---|---|---|---|---|---|
| | | ∞ | ∞ | | | |
| L1 | 1*(ST) | 1.897 | 0.790 | 1.5346 | 56.1 | f1 = 3.882 |
| | 2* | 18.874 | 0.033 | (=D12) | | |
| L2 | 3* | −103.833 | 0.239 | 1.6355 | 23.9 | f2 = −5.451 |
| | 4* | 3.587 | 0.187 | (=D23) | | |
| L3 | 5* | 2.985 | 0.534 | 1.5346 | 56.1 | f3 = 6.997 |
| | 6* | 13.860 | 0.400 | (=D34) | | |
| L4 | 7* | −3.124 | 0.467 | 1.5346 | 56.1 | f4 = −170.613 |
| | 8* | −3.404 | 0.341 | (=D45) | | |
| L5 | 9* | 4.103 | 0.903 | 1.6355 | 23.9 | f5 = −100.264 |
| | 10* | 3.525 | 0.271 | | | |

TABLE 3-continued

| | | f = 4.75 mm Fno = 2.1 ω = 39.3° | | | | |
|---|---|---|---|---|---|---|
| | i | r | d | nd | vd | [mm] |
| L6 | 11* | 8.776 | 0.566 | 1.5346 | 56.1 | f6 = −10.328 |
| | 12* | 3.313 | 0.150 | | | |
| | 13 | ∞ | 0.210 | 1.5168 | 64.2 | |
| | 14 | ∞ | 0.648 | | | |
| (IM) | | ∞ | | | | | f45 = −58.970
f56 = −10.063
f123 = 4.479

TABLE 4

| Aspheric surface data | | | | | | | | |
|---|---|---|---|---|---|---|---|---|
| i | k | A4 | A6 | A8 | A10 | A12 | A14 | A16 |
| 1 | 0 | −5.455E−03 | 1.226E−02 | −2.200E−02 | 7.152E−03 | 3.858E−03 | −3.661E−03 | −7.239E−05 |
| 2 | 0 | 1.716E−01 | −5.004E−01 | 5.796E−01 | −3.655E−01 | 1.016E−01 | 1.749E−03 | −5.201E−03 |
| 3 | 0 | 1.674E−01 | −4.838E−01 | 6.097E−01 | −3.534E−01 | 5.169E−02 | 3.533E−02 | −1.200E−02 |
| 4 | 0 | 1.517E−04 | −9.230E−02 | 1.697E−01 | −8.613E−02 | −8.110E−03 | 2.114E−02 | −4.294E−03 |
| 5 | 0 | −3.759E−02 | −6.562E−02 | 6.871E−02 | −7.731E−02 | 4.946E−02 | −1.483E−02 | 3.394E−03 |
| 6 | 0 | 2.933E−03 | −1.295E−02 | −3.004E−02 | 1.605E−02 | −9.152E−04 | −1.714E−04 | 8.926E−04 |
| 7 | 0 | −2.689E−02 | 3.860E−02 | −2.248E−02 | 1.278E−03 | 1.513E−03 | 2.827E−03 | −1.302E−03 |
| 8 | 0 | −1.295E−01 | 1.149E−01 | −6.277E−02 | 2.245E−02 | 1.752E−04 | −2.429E−03 | 3.876E−04 |
| 9 | 0 | −1.489E−01 | 6.323E−02 | −3.518E−02 | 1.043E−02 | 6.676E−04 | −1.523E−03 | 2.840E−04 |
| 10 | 0 | −6.335E−02 | 4.619E−03 | 1.332E−04 | −1.418E−04 | 2.010E−05 | 4.305E−07 | −1.431E−07 |
| 11 | 0 | −8.078E−02 | 1.360E−02 | −1.105E−04 | −1.119E−04 | 2.576E−07 | 8.320E−07 | −2.796E−08 |
| 12 | 0 | −8.300E−02 | 1.563E−02 | −1.422E−03 | 1.002E−05 | 4.947E−06 | −8.771E−09 | −1.861E−08 |

The values of the respective conditional expressions are as follows:

$D23/D12=5.60$ $(D12/f)\times 100=0.69$ $(D23/f)\times 100=3.94$ $f123/f=0.94$ $f2/f123=-1.22$ $f2/f3=-0.78$ $f3/f=1.47$ $f3/f4=-0.04$ $|R1r|/f=3.97$ $R2f/R2r=-28.95$ $R3f/R3r=0.22$ $D34/D45=1.17$ $f45/f6=5.71$ $T1/T2=3.31$ $T2/T3=0.45$ $T3/T4=1.14$ $T5/T6=1.60$ Accordingly, the imaging lens of Numerical Data Example 2 satisfies the above-described conditional expressions. The distance on the optical axis X from the object-side surface of the first lens L1 to the image plane IM (air-conversion length for the filter 10) is 5.67 mm, and downsizing of the imaging lens is attained.

Figure 5:
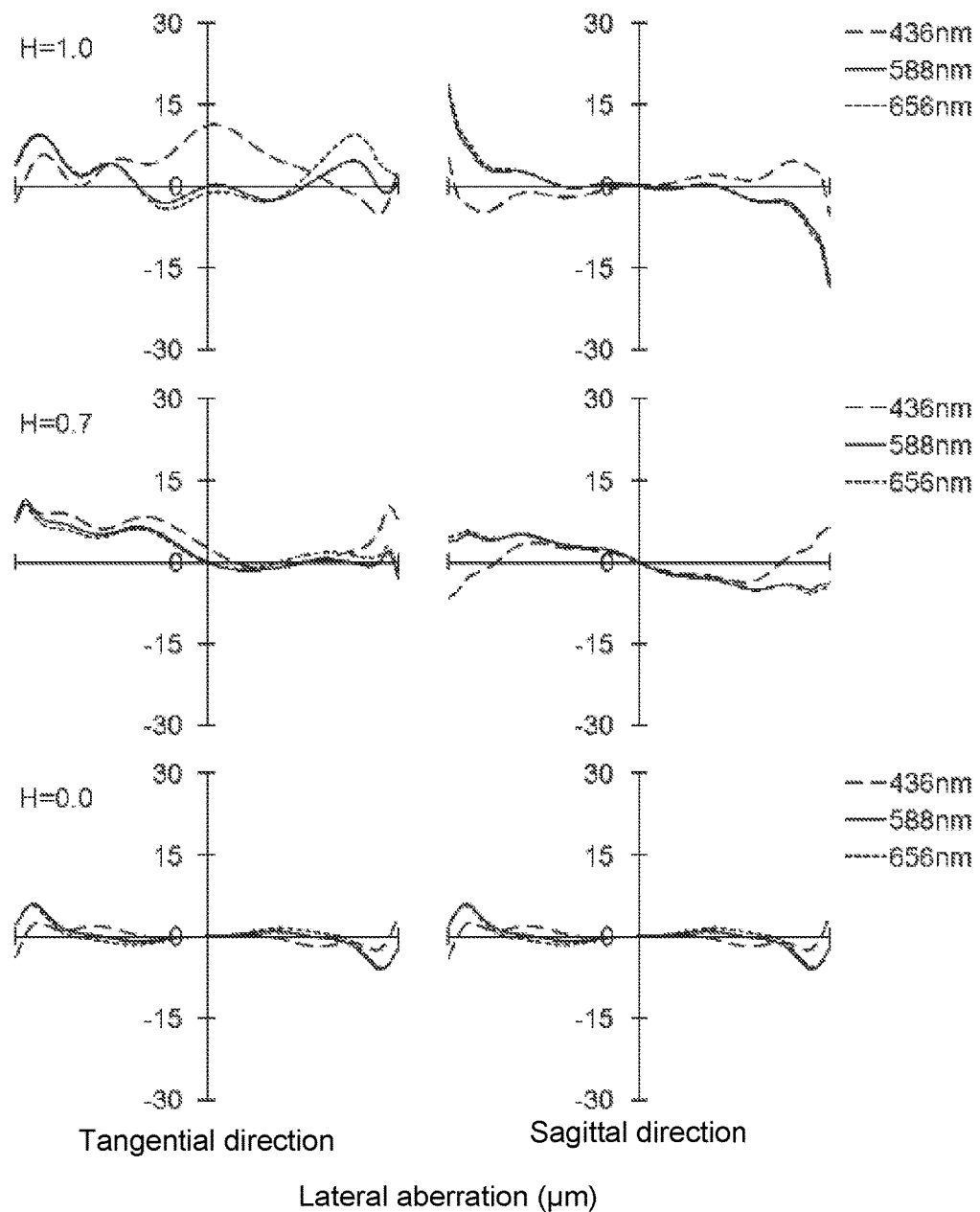
FIG. 5 is an aberration diagram showing a lateral aberration of the imaging lens of FIG. 4.
Figure 6:
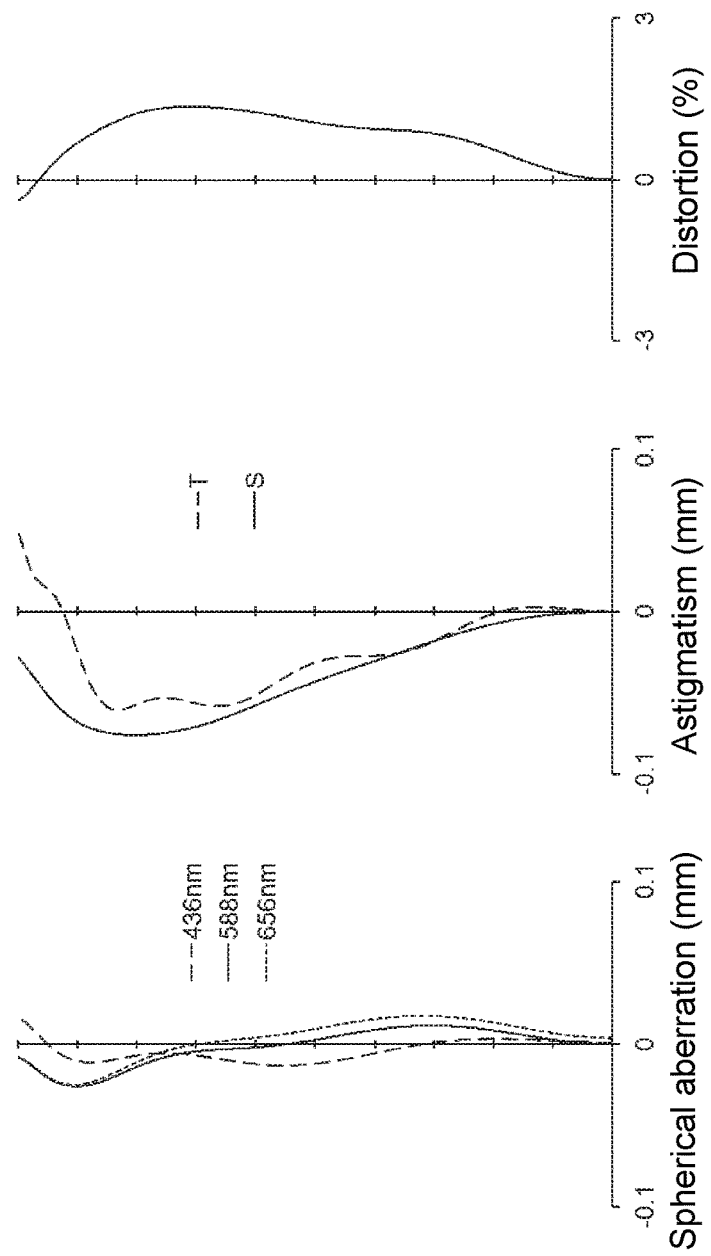
FIG. 6 is an aberration diagram showing a spherical aberration, astigmatism, and a distortion of the imaging lens of FIG. 4.
Figure 7:
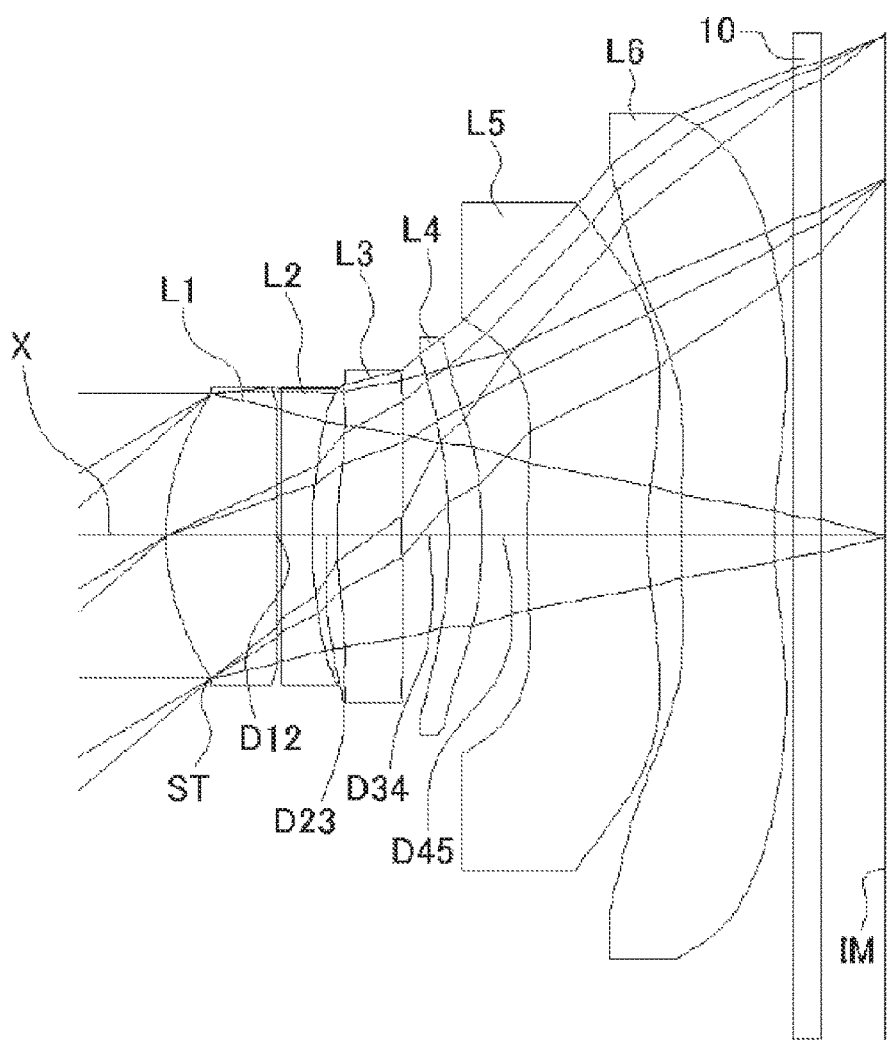
FIG. 7 shows a sectional view of a schematic configuration of an imaging lens in Numerical Data Example 3 according to the embodiment of the present invention.

FIG. 5 shows a lateral aberration that corresponds to the image height ratio H, and FIG. 6 shows a spherical aberration (mm), astigmatism (mm), and a distortion (%), respectively, of the imaging lens of Numerical Data Example 2. As shown in FIGS. 5 and 6, according to the imaging lens of Numerical Data Example 2, the aberrations are also satisfactorily corrected.

Numerical Data Example 3

Basic Lens Data

TABLE 5

| | | f = 4.59 mm Fno = 2.1 ω = 40.3° | | | | |
|---|---|---|---|---|---|---|
| | i | r | d | nd | vd | [mm] |
| | | ∞ | ∞ | | | |
| L1 | 1*(ST) | 1.878 | 0.844 | 1.5346 | 56.1 | f1 = 3.730 |
| | 2* | 27.232 | 0.040 | (=D12) | | |
| L2 | 3* | −322.058 | 0.244 | 1.6355 | 23.9 | f2 = −6.255 |
| | 4* | 4.026 | 0.196 | (=D23) | | |
| L3 | 5* | 3.848 | 0.496 | 1.5346 | 56.1 | f3 = 10.749 |
| | 6* | 11.128 | 0.369 | (=D34) | | |
| L4 | 7* | −4.345 | 0.259 | 1.5346 | 56.1 | f4 = −141.091 |
| | 8* | −4.706 | 0.343 | (=D45) | | |
| L5 | 9* | 3.960 | 0.942 | 1.6355 | 23.9 | f5 = −168.849 |
| | 10* | 3.466 | 0.258 | | | |
| L6 | 11* | 7.574 | 0.723 | 1.5346 | 56.1 | f6 = −11.978 |
| | 12* | 3.354 | 0.150 | | | |
| | 13 | ∞ | 0.210 | 1.5168 | 64.2 | |
| | 14 | ∞ | 0.503 | | | |
| (IM) | | ∞ | | | | | f45 = −71.962
f56 = −12.156
f123 = 4.658

TABLE 6

Aspheric surface data

| i | k | A4 | A6 | A8 | A10 | A12 | A14 | A16 |
|---|---|---|---|---|---|---|---|---|
| 1 | 0 | −5.636E−03 | 1.594E−02 | −2.429E−02 | 7.620E−03 | 4.343E−03 | −3.377E−03 | −2.417E−04 |
| 2 | 0 | 1.738E−01 | −5.001E−01 | 5.794E−01 | −3.653E−01 | 1.005E−01 | 3.971E−03 | −6.543E−03 |
| 3 | 0 | 1.640E−01 | −4.846E−01 | 6.087E−01 | −3.540E−01 | 5.146E−02 | 3.790E−02 | −1.371E−02 |
| 4 | 0 | 7.228E−03 | −9.529E−02 | 1.697E−01 | −8.571E−02 | −7.601E−03 | 2.148E−02 | −4.303E−03 |
| 5 | 0 | −4.083E−02 | −6.560E−02 | 7.090E−02 | −7.585E−02 | 5.002E−02 | −1.496E−02 | 3.489E−03 |
| 6 | 0 | −7.546E−03 | −1.300E−02 | −2.820E−02 | 1.626E−02 | −8.742E−04 | −1.791E−04 | 8.259E−04 |
| 7 | 0 | −2.078E−02 | 3.798E−02 | −2.367E−02 | 1.088E−03 | 1.391E−03 | 2.862E−03 | −1.263E−03 |
| 8 | 0 | −1.282E−01 | 1.159E−01 | −6.221E−02 | 2.267E−02 | 1.863E−04 | −2.416E−03 | 3.439E−04 |
| 9 | 0 | −1.470E−01 | 6.265E−02 | −3.562E−02 | 1.017E−02 | 6.489E−04 | −1.512E−03 | 2.946E−04 |
| 10 | 0 | −6.468E−02 | 4.669E−03 | 1.358E−04 | −1.441E−04 | 1.977E−05 | 3.982E−07 | −1.417E−07 |
| 11 | 0 | −8.232E−02 | 1.356E−02 | −1.084E−04 | −1.170E−04 | 1.489E−06 | 7.682E−07 | −2.890E−08 |
| 12 | 0 | −8.043E−02 | 1.531E−02 | −1.430E−03 | 1.383E−05 | 4.768E−06 | −3.487E−08 | −1.558E−08 |

The values of the respective conditional expressions are as follows:

$D23/D12=4.90$ $(D12/f) \times 100 = 0.87$ $(D23/f) \times 100 = 4.27$ $f123/f = 1.02$ $f2/f123 = -1.34$ $f2/f3 = -0.58$ $f3/f = 2.34$ $f3/f4 = -0.08$ $|R1r|/f = 5.93$ $R2f/R2r = -79.99$ $R3f/R3r = 0.35$ $D34/D45 = 1.08$ $f45/f6 = 6.01$ $T1/T2 = 3.46$ $T2/T3 = 0.49$ $T3/T4 = 1.92$ $T5/T6 = 1.30$ Accordingly, the imaging lens of Numerical Data Example 3 satisfies the above-described conditional expressions. The distance on the optical axis X from the object-side surface of the first lens L1 to the image plane IM (air-conversion length for the filter 10) is 5.51 mm, and downsizing of the imaging lens is attained.

Figure 8:
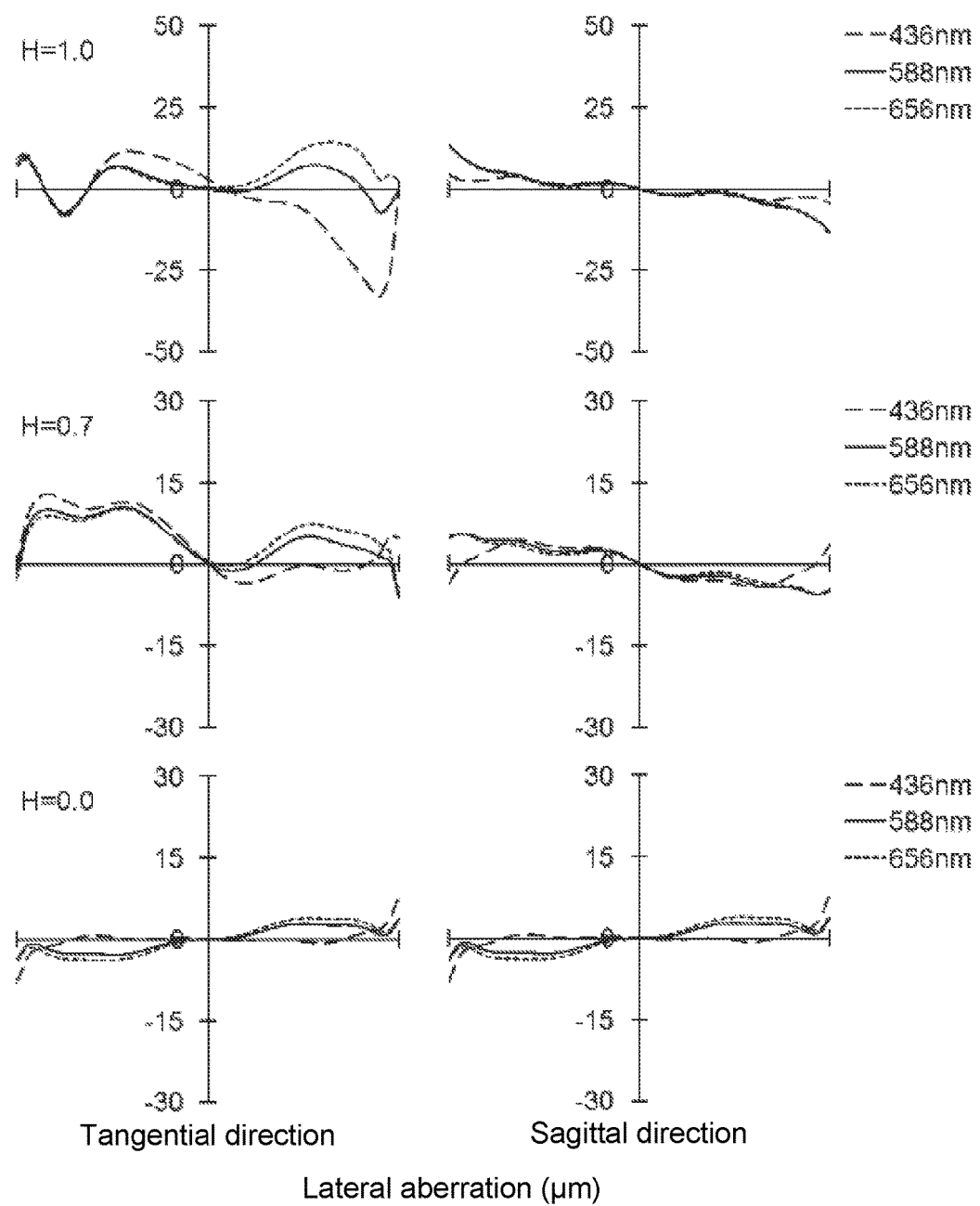
FIG. 8 is an aberration diagram showing a lateral aberration of the imaging lens of FIG. 7.
Figure 9:
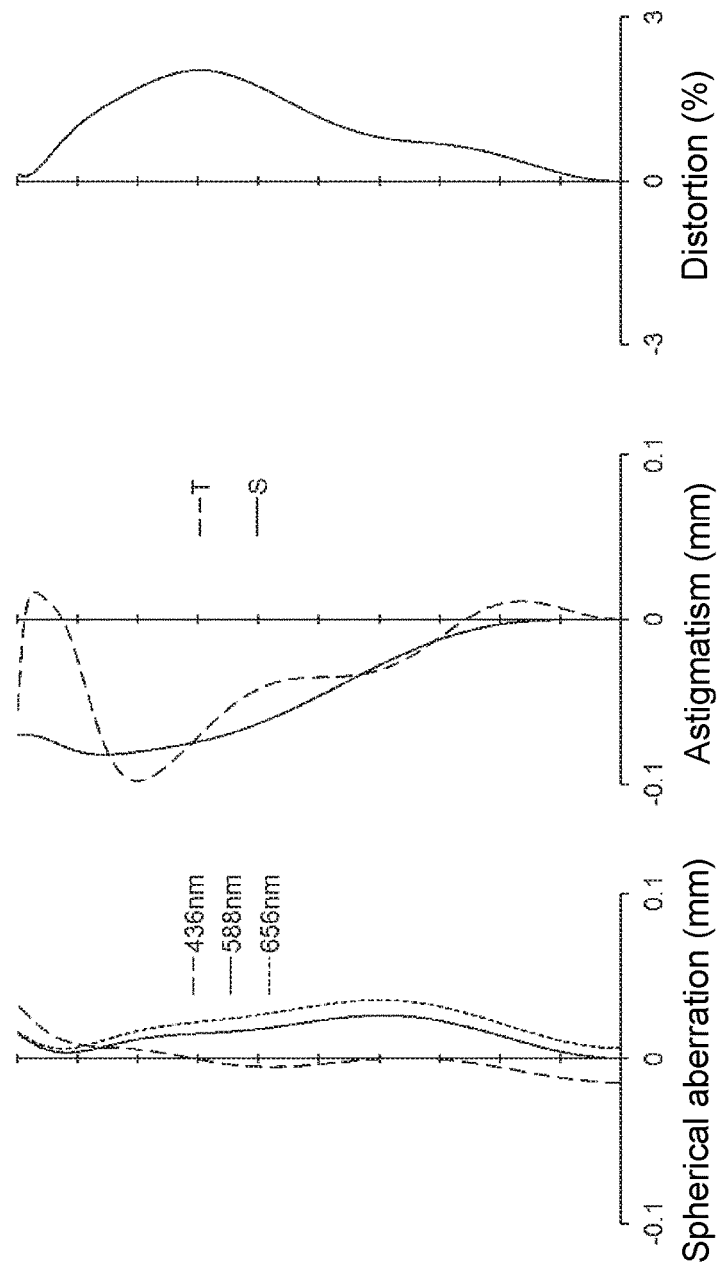
FIG. 9 is an aberration diagram showing a spherical aberration, astigmatism, and a distortion of the imaging lens of FIG. 7.
Figure 10:
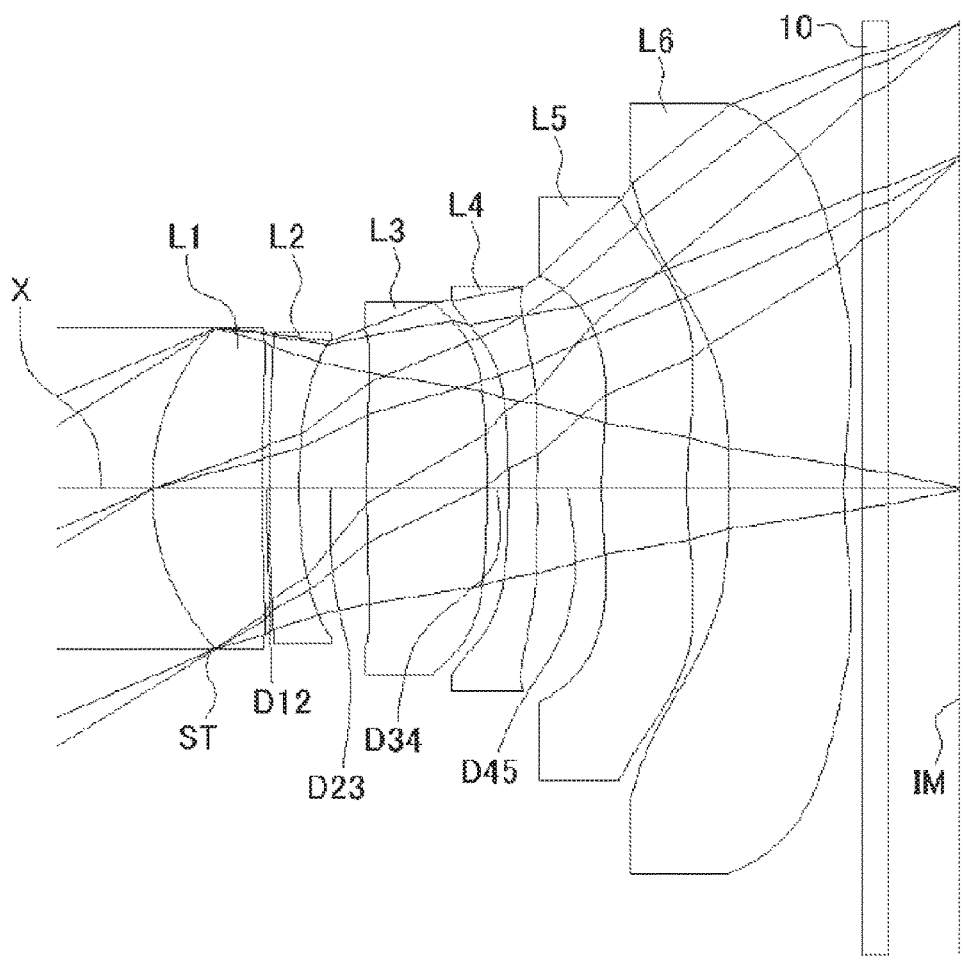
FIG. 10 shows a sectional view of a schematic configuration of an imaging lens in Numerical Data Example 4 according to the embodiment of the present invention.

FIG. 8 shows a lateral aberration that corresponds to the image height ratio H, and FIG. 9 shows a spherical aberration (mm), astigmatism (mm), and a distortion (%), respectively, of the imaging lens of Numerical Data Example 3. As shown in FIGS. 8 and 9, according to the imaging lens of Numerical Data Example 3, the aberrations are also satisfactorily corrected.

Numerical Data Example 4

Basic Lens Data

TABLE 7 f = 6.30 mm Fno = 2.4 ω = 31.7°

| | i | r | d | nd | vd | [mm] |
|---|---|---|---|---|---|---|
| | | ∞ | ∞ | | | |
| L1 | 1*(ST) | 1.949 | 0.909 | 1.5346 | 56.1 | f1 = 3.585 |
| | 2* | −98.128 | 0.055 | (=D12) | | |
| L2 | 3* | −229.614 | 0.237 | 1.6355 | 23.9 | f2 = −7.043 |
| | 4* | 4.566 | 0.559 | (=D23) | | |
| L3 | 5* | 20.772 | 0.980 | 1.5346 | 56.1 | f3 = 15.456 |
| | 6* | −13.495 | 0.177 | (=D34) | | |
| L4 | 7* | −11.944 | 0.238 | 1.5346 | 56.1 | f4 = −18.179 |
| | 8* | 52.527 | 0.526 | (=D45) | | |
| L5 | 9* | 4.754 | 0.696 | 1.6355 | 23.9 | f5 = −100.822 |
| | 10* | 4.174 | 0.341 | | | |
| L6 | 11* | −15.270 | 0.945 | 1.5346 | 56.1 | f6 = −5.586 |
| | 12* | 3.792 | 0.150 | | | |
| | 13 | ∞ | 0.210 | 1.5168 | 64.2 | |
| | 14 | ∞ | 0.582 | | | |
| (IM) | | ∞ | | | | | f45 = −14.525
f56 = −5.548
f123 = 4.806

TABLE 8

Aspheric surface data

| i | k | A4 | A6 | A8 | A10 | A12 | A14 | A16 |
|---|---|---|---|---|---|---|---|---|
| 1 | 0 | 2.252E−03 | 1.015E−02 | −1.581E−02 | 6.976E−03 | 3.286E−03 | −3.094E−03 | 5.528E−04 |
| 2 | 0 | 1.743E−01 | −4.560E−01 | 5.706E−01 | −3.726E−01 | 1.243E−01 | −2.026E−02 | 1.581E−03 |
| 3 | 0 | 1.881E−01 | −4.965E−01 | 6.069E−01 | −3.275E−01 | 3.112E−02 | 3.293E−02 | −8.402E−03 |

TABLE 8-continued

| | | | | Aspheric surface data | | | | |
|---|---|---|---|---|---|---|---|---|
| i | k | A4 | A6 | A8 | A10 | A12 | A14 | A16 |
| 4 | 0 | 7.130E−02 | −1.381E−01 | 1.900E−01 | −8.825E−02 | −1.555E−02 | 2.213E−02 | −3.252E−03 |
| 5 | 0 | 4.354E−04 | −2.128E−02 | 4.538E−02 | −5.976E−02 | 4.648E−02 | −2.058E−02 | 3.455E−03 |
| 6 | 0 | −1.697E−02 | −1.468E−03 | −2.963E−02 | 1.397E−02 | −1.849E−03 | −9.515E−04 | 3.661E−04 |
| 7 | 0 | −5.057E−02 | 2.576E−02 | −3.928E−02 | 2.619E−02 | 9.020E−04 | 3.078E−03 | −8.405E−04 |
| 8 | 0 | −1.028E−01 | 1.035E−01 | −7.558E−02 | 2.323E−02 | 2.053E−03 | −2.476E−03 | 3.699E−04 |
| 9 | 0 | −1.210E−01 | 4.499E−02 | −2.280E−02 | 3.768E−03 | 2.025E−03 | −1.144E−03 | 1.578E−04 |
| 10 | 0 | −7.454E−02 | 4.110E−03 | 3.789E−04 | −5.602E−05 | 1.397E−05 | 1.279E−06 | −3.940E−07 |
| 11 | 0 | −8.124E−02 | 1.551E−02 | −1.272E−04 | −1.421E−04 | 6.317E−07 | 9.076E−07 | −1.017E−08 |
| 12 | 0 | −9.633E−02 | 2.184E−02 | −2.375E−03 | 7.748E−05 | 2.621E−06 | 1.777E−08 | −1.673E−08 |

The values of the respective conditional expressions are as follows:

$D23/D12=10.16$ $(D12/f)\times100=0.87$ $(D23/f)\times100=8.87$ $f123/f=0.76$ $f2/f123=-1.47$ $f2/f3=-0.46$ $f3/f=2.45$ $f3/f4=-0.85$ $|R1r|/f=15.58$ $R2f/R2r=-50.29$ $R3f/R3r=-1.54$ $D34/D45=0.34$ $f45/f6=2.60$ $T1/T2=3.84$ $T2/T3=0.24$ $T3/T4=4.12$ $T5/T6=0.74$ Accordingly, the imaging lens of Numerical Data Example 4 satisfies the above-described conditional expressions. The distance on the optical axis X from the object-side surface of the first lens L1 to the image plane IM (air-conversion length for the filter 10) is 6.53 mm, and downsizing of the imaging lens is attained.

Figure 11:
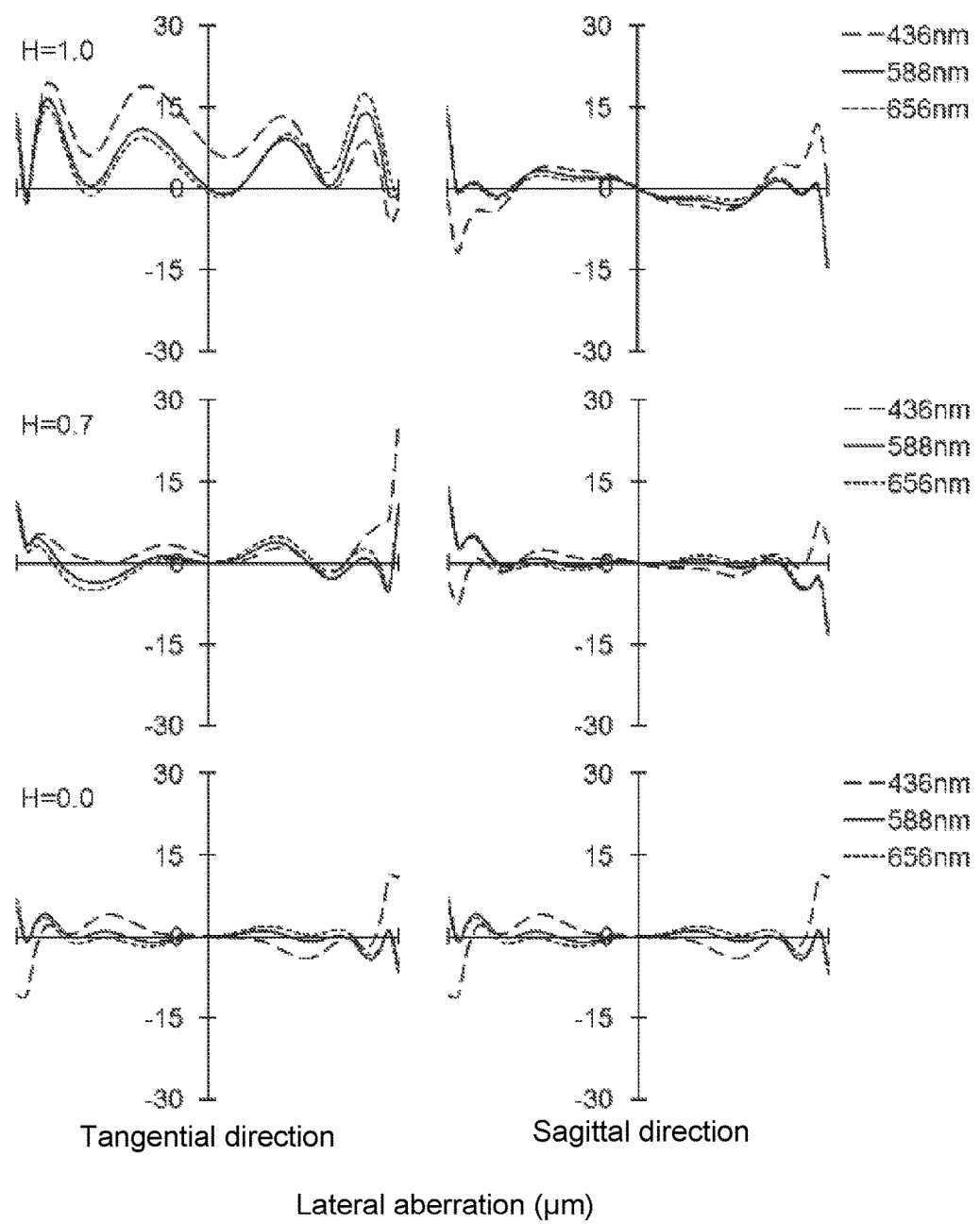
FIG. 11 is an aberration diagram showing a lateral aberration of the imaging lens of FIG. 10.
Figure 12:
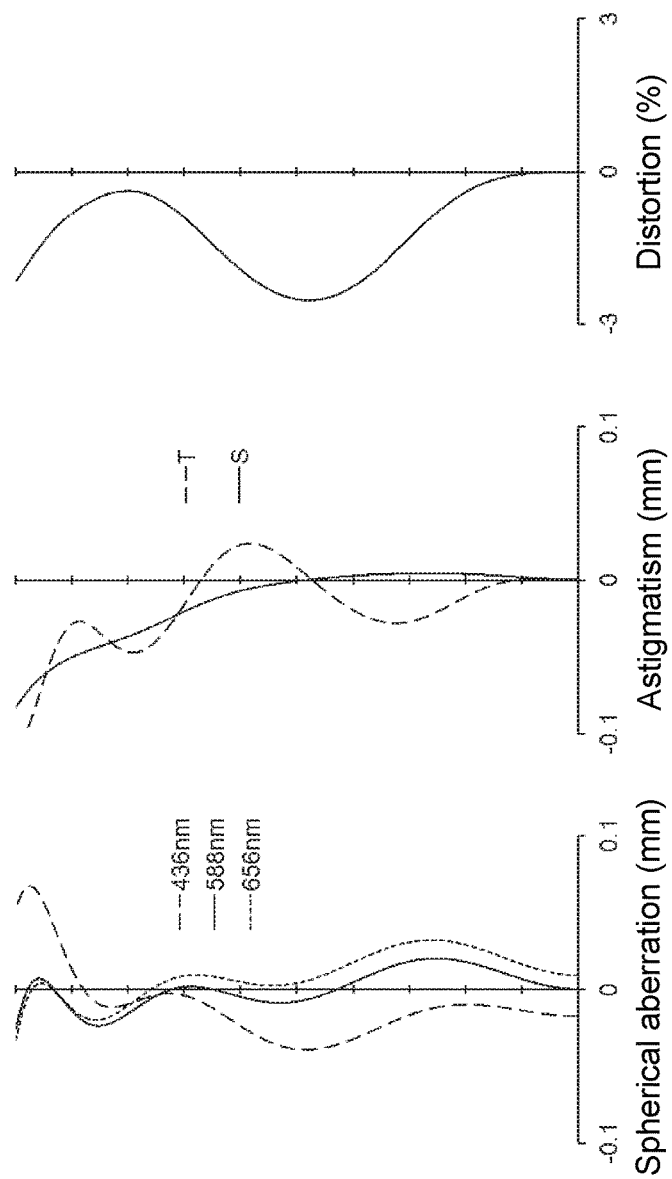
FIG. 12 is an aberration diagram showing a spherical aberration, astigmatism, and a distortion of the imaging lens of FIG. 10.
Figure 13:
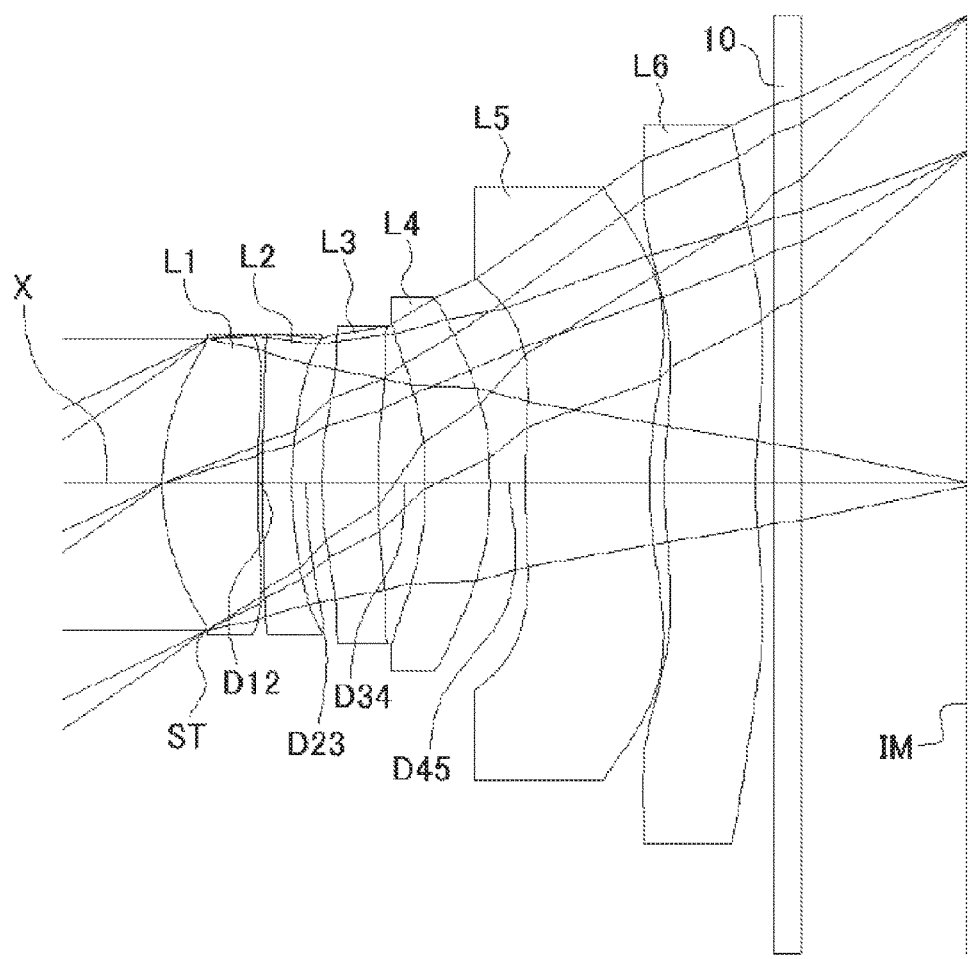
FIG. 13 shows a sectional view of a schematic configuration of an imaging lens in Numerical Data Example 5 according to the embodiment of the present invention.

FIG. 11 shows a lateral aberration that corresponds to the image height ratio H, and FIG. 12 shows a spherical aberration (mm), astigmatism (mm), and a distortion (%), respectively, of the imaging lens of Numerical Data Example 4. As shown in FIGS. 11 and 12, according to the imaging lens of Numerical Data Example 4, the aberrations are also satisfactorily corrected.

Numerical Data Example 5

Basic Lens Data

TABLE 9

| | | f = 5.64 mm Fno = 2.4 ω = 34.6° | | | | |
|---|---|---|---|---|---|---|
| | | r | d | nd | vd | [mm] |
| | | ∞ | ∞ | | | |
| L1 | 1*(ST) | 1.920 | 0.775 | 1.5346 | 56.1 | f1 = 3.935 |
| | 2* | 18.951 | 0.042 | (=D12) | | |
| L2 | 3* | −278.506 | 0.238 | 1.6355 | 23.9 | f2 = −5.409 |
| | 4* | 3.481 | 0.237 | (=D23) | | |
| L3 | 5* | 2.706 | 0.455 | 1.5346 | 56.1 | f3 = 8.738 |
| | 6* | 6.053 | 0.386 | (=D34) | | |
| L4 | 7* | −2.832 | 0.523 | 1.5346 | 56.1 | f4 = −27.989 |
| | 8* | −3.718 | 0.280 | (=D45) | | |
| L5 | 9* | 4.395 | 1.004 | 1.6355 | 23.9 | f5 = −21.375 |
| | 10* | 3.026 | 0.123 | | | |
| L6 | 11* | 4.096 | 0.740 | 1.5346 | 56.1 | f6 = 43.525 |
| | 12* | 4.658 | 0.150 | | | |
| | 13 | ∞ | 0.210 | 1.5168 | 64.2 | |
| | 14 | ∞ | 1.351 | | | |
| (IM) | | ∞ | | | | | f45 = −11.038
f56 = −35.332
f123 = 5.080

TABLE 10

| | | | | Aspheric surface data | | | | |
|---|---|---|---|---|---|---|---|---|
| i | k | A4 | A6 | A8 | A10 | A12 | A14 | A16 |
| 1 | 0 | −3.343E−03 | 1.228E−02 | −2.152E−02 | 6.706E−03 | 3.560E−03 | −3.355E−03 | 2.569E−05 |
| 2 | 0 | 1.757E−01 | −4.966E−01 | 5.780E−01 | −3.658E−01 | 1.014E−01 | 1.928E−03 | −5.101E−03 |
| 3 | 0 | 1.698E−01 | −4.830E−01 | 6.095E−01 | −3.535E−01 | 5.194E−02 | 3.490E−02 | −1.188E−02 |
| 4 | 0 | −4.912E−04 | −9.200E−02 | 1.704E−01 | −8.597E−02 | −8.383E−03 | 2.072E−02 | −4.536E−03 |
| 5 | 0 | −4.045E−02 | −6.692E−02 | 6.874E−02 | −7.720E−02 | 4.907E−02 | −1.518E−02 | 3.250E−03 |

TABLE 10-continued

| | | | | Aspheric surface data | | | | |
|---|---|---|---|---|---|---|---|---|
| i | k | A4 | A6 | A8 | A10 | A12 | A14 | A16 |
| 6 | 0 | 8.533E−04 | −1.424E−02 | −2.975E−02 | 1.607E−02 | −8.649E−04 | −1.295E−05 | 9.492E−04 |
| 7 | 0 | −2.304E−02 | 4.427E−02 | −2.227E−02 | 9.644E−04 | 1.563E−03 | 2.818E−03 | −1.326E−03 |
| 8 | 0 | −1.398E−01 | 1.161E−01 | −6.171E−02 | 2.276E−02 | 2.432E−05 | −2.446E−03 | 3.550E−04 |
| 9 | 0 | −1.479E−01 | 6.628E−02 | −3.565E−02 | 1.008E−02 | 7.377E−04 | −1.492E−03 | 2.857E−04 |
| 10 | 0 | −6.900E−02 | 4.109E−03 | 1.831E−04 | −1.378E−04 | 2.007E−05 | 4.261E−07 | −1.668E−07 |
| 11 | 0 | −8.716E−02 | 1.354E−02 | −9.241E−05 | −1.107E−04 | 4.442E−07 | 8.477E−07 | −3.171E−08 |
| 12 | 0 | −7.134E−02 | 1.513E−02 | −1.382E−03 | 1.076E−05 | 4.874E−06 | −4.061E−09 | −1.634E−08 |

The values of the respective conditional expressions are as follows:

$D23/D12=5.64$ $(D12/f)\times100=0.74$ $(D23/f)\times100=4.20$ $f123/f=0.90$ $f2/f123=-1.06$ $f2/f3=-0.62$ $f3/f=1.55$ $f3/f4=-0.31$ $|R1r|/f=3.36$ $R2f/R2r=-80.01$ $R3f/R3r=0.45$ $D34/D45=1.38$ $F45/f6=-0.25$ $T1/T2=3.26$ $T2/T3=0.52$ $T3/T4=0.87$ $T5/T6=1.36$ Accordingly, the imaging lens of Numerical Data Example 5 satisfies the above-described conditional expressions. The distance on the optical axis X from the object-side surface of the first lens L1 to the image plane IM (air-conversion length for the filter 10) is 6.44 mm, and downsizing of the imaging lens is attained.

Figure 14:
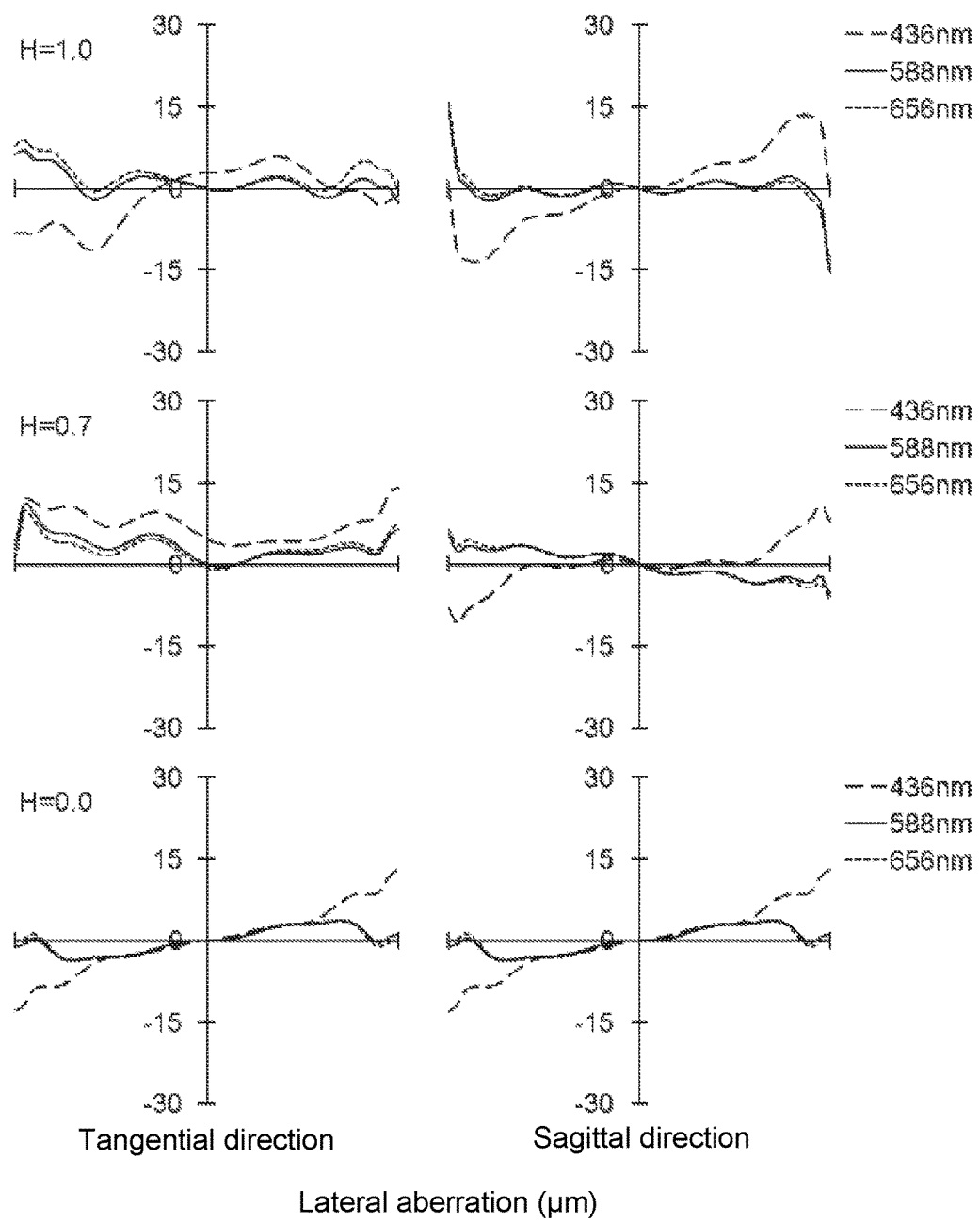
FIG. 14 is an aberration diagram showing a lateral aberration of the imaging lens of FIG. 13.
Figure 15:
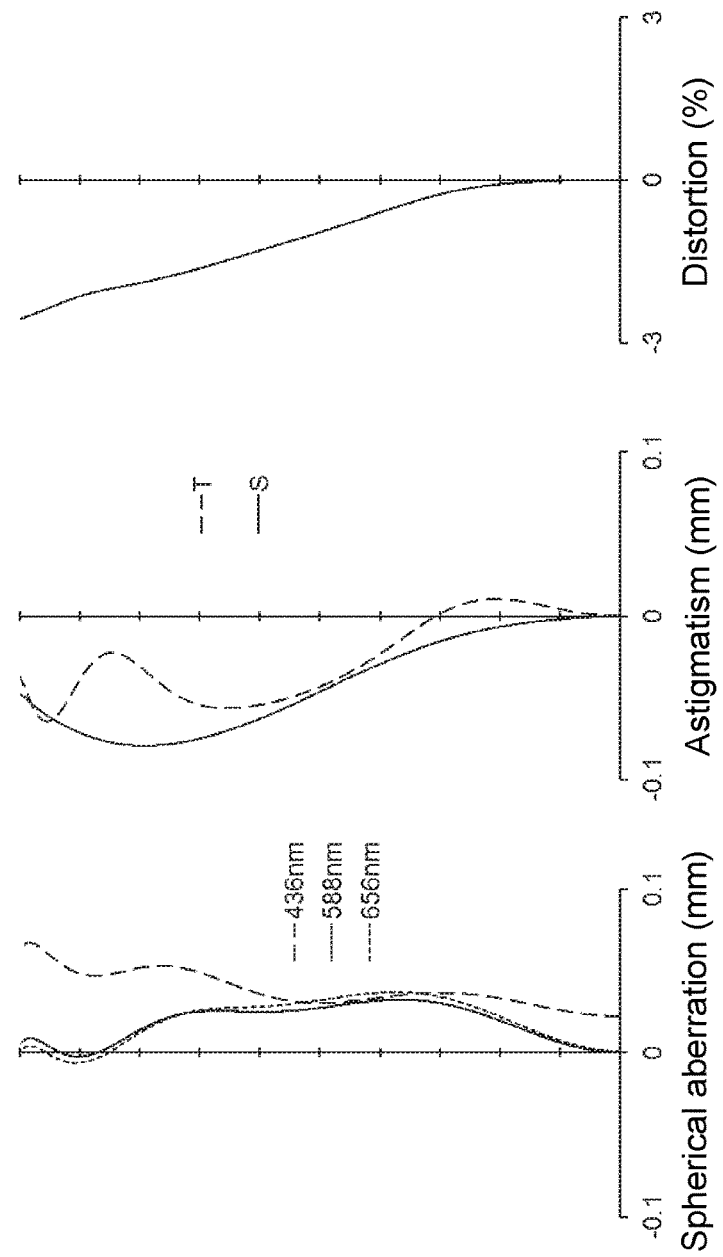
FIG. 15 is an aberration diagram showing a spherical aberration, astigmatism, and a distortion of the imaging lens of FIG. 13.
Figure 16:
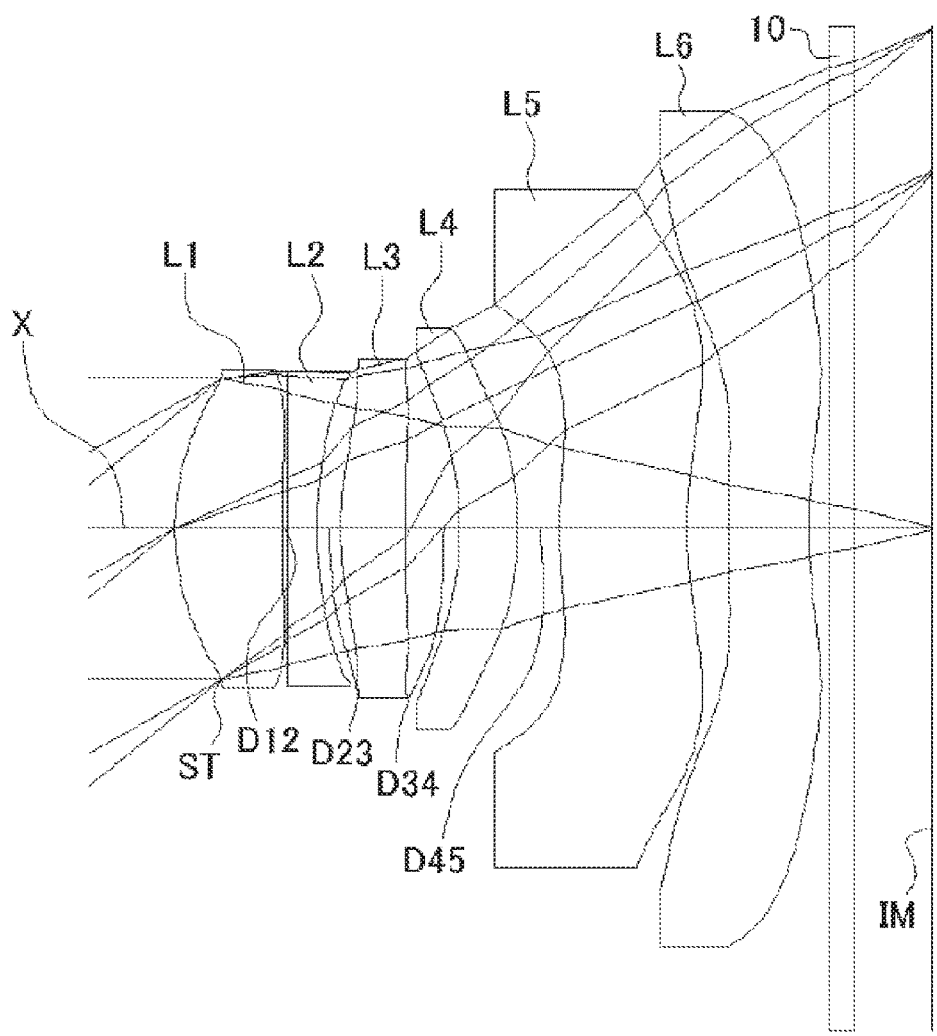
FIG. 16 shows a sectional view of a schematic configuration of an imaging lens in Numerical Data Example 6 according to the embodiment of the present invention.

FIG. 14 shows a lateral aberration that corresponds to the image height ratio H, and FIG. 15 shows a spherical aberration (mm), astigmatism (mm), and a distortion (%), respectively, of the imaging lens of Numerical Data Example 5. As shown in FIGS. 14 and 15, according to the imaging lens of Numerical Data Example 5, the aberrations are also satisfactorily corrected.

Numerical Data Example 6

Basic Lens Data

TABLE 11

| | | | | | | |
|---|---|---|---|---|---|---|
| f = 4.83 mm Fno = 2.1 ω = 38.9° | | | | | | |
| | i | r | d | nd | vd | [mm] |
| | | ∞ | ∞ | | | |
| L1 | 1*(ST) | 1.942 | 0.827 | 1.5346 | 56.1 | f1 = 3.891 |
| | 2* | 24.930 | 0.031 | (=D12) | | |
| L2 | 3* | −97.261 | 0.237 | 1.6355 | 23.9 | f2 = −5.051 |
| | 4* | 3.323 | 0.183 | (=D23) | | |
| L3 | 5* | 2.804 | 0.488 | 1.5346 | 56.1 | f3 = 6.488 |
| | 6* | 13.741 | 0.419 | (=D34) | | |
| L4 | 7* | −2.739 | 0.449 | 1.5346 | 56.1 | f4 = −101.271 |
| | 8* | −3.050 | 0.327 | (=D45) | | |
| L5 | 9* | 3.703 | 0.975 | 1.5346 | 56.1 | f5 = −101.244 |
| | 10* | 3.148 | 0.318 | | | |
| L6 | 11* | 8.798 | 0.617 | 1.5346 | 56.1 | f6 = −10.534 |
| | 12* | 3.350 | 0.150 | | | |
| | 13 | ∞ | 0.210 | 1.5168 | 64.2 | |
| | 14 | ∞ | 0.593 | | | |
| (IM) | | ∞ | | | | |

$f45 = -46.702$
$f56 = -10.306$
$f123 = 4.546$

TABLE 12

| | | | | Aspheric surface data | | | | |
|---|---|---|---|---|---|---|---|---|
| i | k | A4 | A6 | A8 | A10 | A12 | A14 | A16 |
| 1 | 0 | −5.785E−03 | 1.314E−02 | −2.182E−02 | 7.155E−03 | 3.957E−03 | −3.531E−03 | 2.974E−05 |
| 2 | 0 | 1.698E−01 | −5.006E−01 | 5.799E−01 | −3.652E−01 | 1.017E−01 | 1.781E−03 | −5.235E−03 |
| 3 | 0 | 1.640E−01 | −4.852E−01 | 6.090E−01 | −3.537E−01 | 5.157E−02 | 3.530E−02 | −1.201E−02 |
| 4 | 0 | 1.296E−03 | −9.417E−02 | 1.695E−01 | −8.623E−02 | −8.250E−03 | 2.093E−02 | −4.618E−03 |
| 5 | 0 | −3.064E−02 | −6.295E−02 | 6.893E−02 | −7.790E−02 | 4.864E−02 | −1.520E−02 | 3.231E−03 |
| 6 | 0 | 8.027E−03 | −1.072E−02 | −3.107E−02 | 1.538E−02 | −1.135E−03 | −1.920E−04 | 8.638E−04 |
| 7 | 0 | −2.903E−02 | 4.064E−02 | −2.030E−02 | 1.767E−03 | 1.253E−03 | 2.597E−03 | −1.248E−03 |
| 8 | 0 | −1.262E−01 | 1.138E−01 | −6.269E−02 | 2.260E−02 | 2.547E−04 | −2.424E−03 | 3.628E−04 |

TABLE 12-continued

| | | Aspheric surface data | | | | | | |
|---|---|---|---|---|---|---|---|---|
| i | k | A4 | A6 | A8 | A10 | A12 | A14 | A16 |
| 9 | 0 | −1.578E−01 | 6.936E−02 | −3.620E−02 | 1.020E−02 | 6.744E−04 | −1.511E−03 | 2.836E−04 |
| 10 | 0 | −6.600E−02 | 4.586E−03 | 1.456E−04 | −1.410E−04 | 2.003E−05 | 4.075E−07 | −1.474E−07 |
| 11 | 0 | −8.132E−02 | 1.361E−02 | −1.045E−04 | −1.114E−04 | 2.563E−07 | 8.275E−07 | −2.883E−08 |
| 12 | 0 | −8.360E−02 | 1.569E−02 | −1.399E−03 | 9.769E−06 | 4.721E−06 | −1.804E−08 | −1.632E−08 |

The values of the respective conditional expressions are as follows:

$$D23/D12=5.90$$

$$(D12/f)\times 100=0.64$$

$$(D23/f)\times 100=3.79$$

$$f123/f=0.94$$

$$f2/f123=-1.11$$

$$f2/f3=-0.78$$

$$f3/f=1.34$$

$$f3/f4=-0.06$$

$$|R1r|/f=5.16$$

$$R2f/R2r=-29.27$$

$$R3f/R3r=0.20$$

$$D34/D45=1.28$$

$$f45/f6=4.43$$

$$T1/T2=3.49$$

$$T2/T3=0.49$$

$$T3/T4=1.09$$

$$T5/T6=1.58$$

Accordingly, the imaging lens of Numerical Data Example 6 satisfies the above-described conditional expressions. The distance on the optical axis X from the object-side surface of the first lens L1 to the image plane IM (air-conversion length for the filter 10) is 5.75 mm, and downsizing of the imaging lens is attained.

Figure 17:
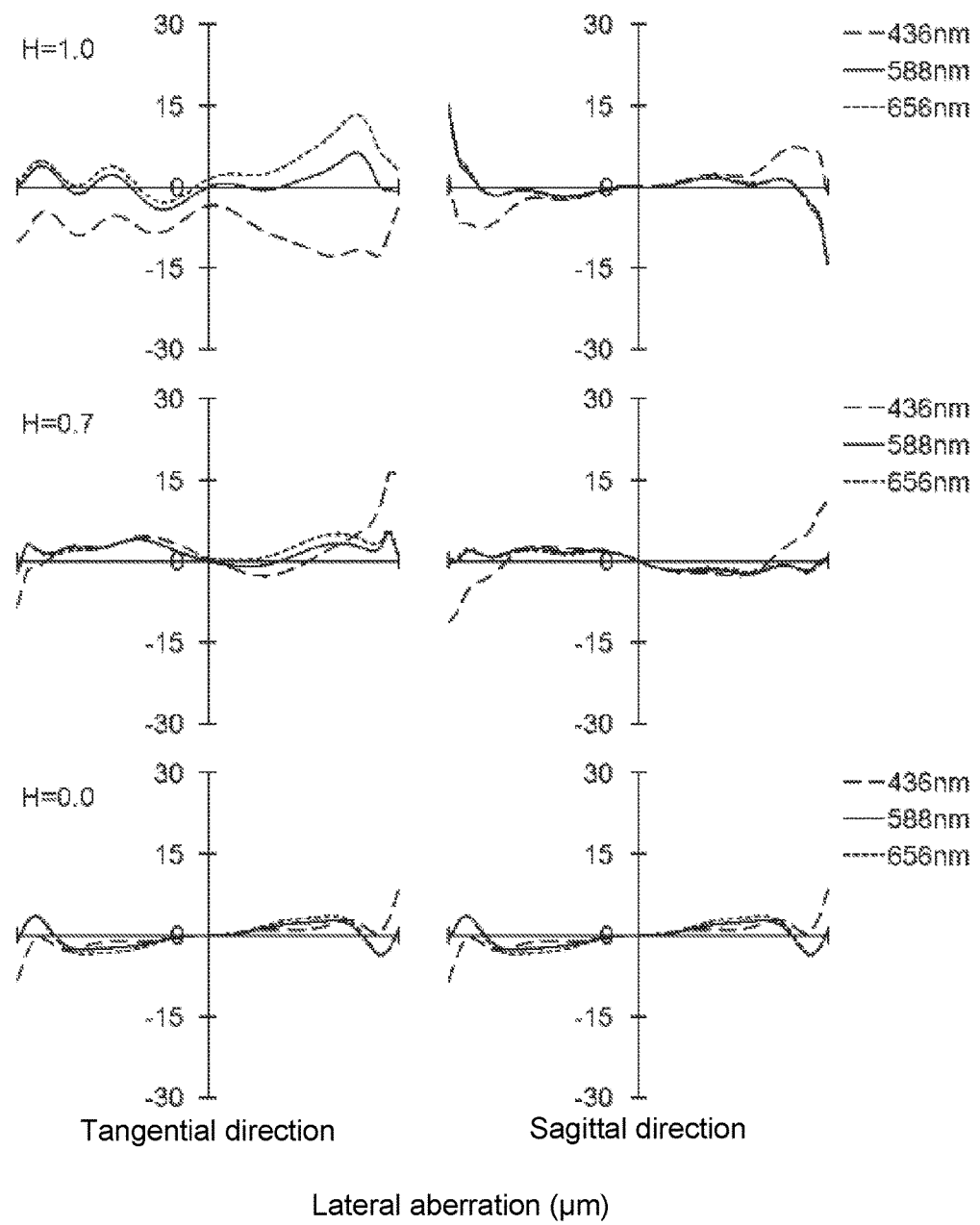
FIG. 17 is an aberration diagram showing a lateral aberration of the imaging lens of FIG. 16.
Figure 18:
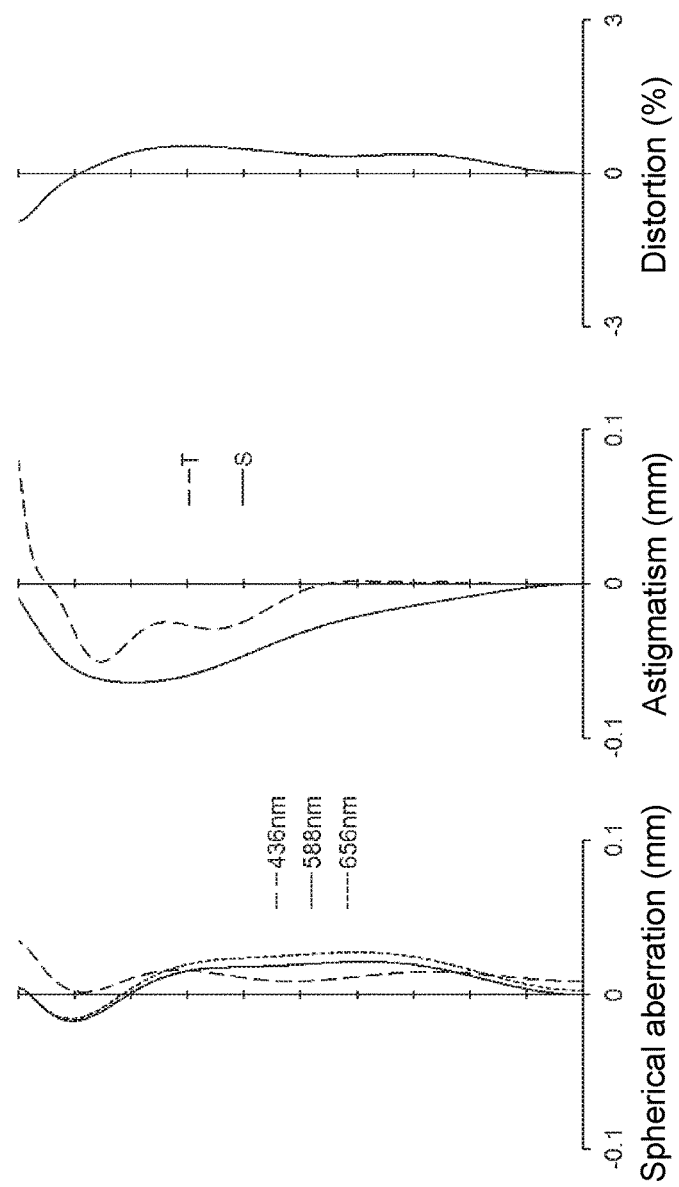
FIG. 18 is an aberration diagram showing a spherical aberration, astigmatism, and a distortion of the imaging lens of FIG. 16.

FIG. 17 shows a lateral aberration that corresponds to the image height ratio H, and FIG. 18 shows a spherical aberration (mm), astigmatism (mm), and a distortion (%), respectively, of the imaging lens of Numerical Data Example 6. As shown in FIGS. 17 and 18, according to the imaging lens of Numerical Data Example 6, the aberrations are also satisfactorily corrected.

As described above, according to the imaging lens of the embodiment described above has very wide angle of view (2w) of 60° or greater. According to Numerical Data Examples 1 to 6, the imaging lenses have wide angles of view of 63.4° to 80.6°. According to the imaging lens of the embodiment, it is possible to take an image over a wider range than that taken by a conventional imaging lens.

Moreover, in these years, with advancement in digital zoom technology, which enables to enlarge any area of an image obtained through an imaging lens by image processing, an imaging element having a high pixel count is often used in combination with a high-resolution imaging lens. In case of such an imaging element with a high pixel count, a light-receiving area of each pixel often decreases, so that an image taken tends to be dark. According to the imaging lenses of Numerical Data Examples 1 to 6, the Fnos are as small as 2.1 to 2.4. According to the imaging lens of the embodiment, it is possible to obtain a sufficiently bright image, which can be suitably applied in the high-pixel imaging element described above.

Accordingly, when the imaging lens of the embodiment is mounted in an imaging optical system, such as cameras built in portable devices including cellular phones, portable information terminals, and smartphones, digital still cameras, security cameras, vehicle onboard cameras, and network cameras, it is possible to attain both high performance and downsizing of the cameras.

The present invention is applicable to an imaging lens to be mounted in relatively small cameras, such as cameras to be built in portable devices including cellular phones, smartphones, and portable information terminals, digital still cameras, security cameras, vehicle onboard cameras, and network cameras.

The disclosure of Japanese Patent Application No. 2015-115921, filed on Jun. 8, 2015, is incorporated in the application by reference.

While the present invention has been explained with reference to the specific embodiment of the present invention, the explanation is illustrative and the present invention is limited only by the appended claims.

What is claimed is:
1. An imaging lens comprising:
an aperture stop;
a first lens having positive refractive power;
a second lens having negative refractive power;
a third lens;
a fourth lens;
a fifth lens having negative refractive power; and
a sixth lens, arranged in this order from an object side to an image plane side,
wherein
said first lens is formed in a shape so that a surface thereof on the image plane side has a positive curvature radius,
said third lens is formed in a shape so that a surface thereof on the image plane side has a positive curvature radius,
said fifth lens is formed in a shape so that a surface thereof on the object side and a surface thereof on the image plane side have inflection points and are aspheric,
said sixth lens is formed in a shape so that a surface thereof on the object side has a positive curvature radius,
said first lens has a thickness T1 on an optical axis thereof,
said second lens has a thickness T2 on an optical axis thereof, and said third lens has a thickness T3 on an optical axis thereof so that the following conditional expressions are satisfied:

$$3.0<T1/T2<4.0,$$

$$0.15<T2/T3\leq0.52,$$

and
said first lens is disposed away from the second lens by a distance D12 on the optical axis, and said second lens is disposed away from the third lens by a distance D23 on the optical axis so that the following conditional expression is satisfied:

$$3.38\leq D23/D12<20.$$

2. The imaging lens according to claim 1, wherein said second lens has a focal length f2 and said third lens has a focal length f3 so that the following conditional expression is satisfied:

$$-1.3<f2/f3<-0.3.$$

3. The imaging lens according to claim 1, wherein said third lens has a focal length f3 so that the following conditional expression is satisfied:

$$0.5<f3/f<3.0,$$

where f is a focal length of a whole lens system.

4. The imaging lens according to claim 1, wherein said third lens has a focal length f3 and said fourth lens has a focal length f4 so that the following conditional expression is satisfied:

$$-1.0<f3/f4<-0.01.$$

5. The imaging lens according to claim 1, wherein said third lens is formed in a shape such that a surface thereof on the object side has a curvature radius R3f and a surface thereof on the image plane side has a curvature radius R3r so that the following conditional expression is satisfied:

$$-2.0<R3f/R3r<0.6.$$

6. The imaging lens according to claim 1, wherein said third lens is disposed away from the fourth lens by a distance D34 on the optical axis, and said fourth lens is disposed away from the fifth lens by a distance D45 on an optical axis thereof so that the following conditional expression is satisfied:

$$0.2<D34/D45<2.0.$$

7. The imaging lens according to claim 1, wherein said fourth lens has a thickness T4 on an optical axis thereof so that the following conditional expression is satisfied:

$$0.7<T3/T4<4.5.$$

8. The imaging lens according to claim 1, wherein said fifth lens has a thickness T5 on an optical axis thereof and said sixth lens has a thickness T6 on an optical axis thereof so that the following conditional expression is satisfied:

$$0.6<T5/T6<2.0.$$

9. The imaging lens according to claim 1, wherein said third lens has an Abbe's number vd3 so that the following conditional expression is satisfied:

$$40<vd3<75.$$

10. The imaging lens according to claim 1, wherein said fifth lens has an Abbe's number vd5 so that the following conditional expression is satisfied:

$$15<vd5<35.$$

11. An imaging lens comprising:
an aperture stop;
a first lens having positive refractive power;
a second lens having negative refractive power;
a third lens;
a fourth lens;
a fifth lens having negative refractive power; and
a sixth lens, arranged in this order from an object side to an image plane side,
wherein said first lens is formed in a shape so that a surface thereof on the image plane side has a positive curvature radius,
said second lens is formed in a shape so that a surface thereof on the object side has a negative curvature radius,
said third lens is formed in a shape so that a surface thereof on the image plane side has a positive curvature radius,
said fifth lens is formed in a shape so that a surface thereof on the object side and a surface thereof on the image plane side have inflection points and are aspheric,
said sixth lens is formed in a shape so that a surface thereof on the object side has a positive curvature radius, and
said first lens has a thickness T1 on an optical axis thereof, said second lens has a thickness T2 on an optical axis thereof, and said third lens has a thickness T3 on an optical axis thereof so that the following conditional expressions are satisfied:

$$3.0<T1/T2<4.0,$$

$$0.15<T2/T3<0.6.$$

12. The imaging lens according to claim 11, wherein said second lens has a focal length f2 and said third lens has a focal length f3 so that the following conditional expression is satisfied:

$$-1.3<f2/f3<-0.3.$$

13. The imaging lens according to claim 11, wherein said third lens has a focal length f3 so that the following conditional expression is satisfied:

$$0.5<f3/f<3.0,$$

where f is a focal length of a whole lens system.

14. The imaging lens according to claim 11, wherein said third lens has a focal length f3 and said fourth lens has a focal length f4 so that the following conditional expression is satisfied:

$$-1.0<f3/f4<-0.01.$$

15. The imaging lens according to claim 11, wherein said third lens is formed in a shape such that a surface thereof on the object side has a curvature radius R3f and the surface thereof on the image plane side has a curvature radius R3r so that the following conditional expression is satisfied:

$$-2.0<R3f/R3r<0.6.$$

16. The imaging lens according to claim 11, wherein said third lens is disposed away from the fourth lens by a distance D34 on the optical axis, and said fourth lens is disposed away from the fifth lens by a distance D45 on an optical axis thereof so that the following conditional expression is satisfied:

$$0.2<D34/D45<2.0.$$

17. The imaging lens according to claim 11, wherein said fourth lens has a thickness T4 on an optical axis thereof so that the following conditional expression is satisfied:

$$0.7 < T3/T4 < 4.5.$$

18. The imaging lens according to claim 11, wherein said fifth lens has a thickness T5 on an optical axis thereof and said sixth lens has a thickness T6 on an optical axis thereof so that the following conditional expression is satisfied:

$$0.6 < T5/T6 < 2.0.$$

19. The imaging lens according to claim 11, wherein said third lens has an Abbe's number vd3 so that the following conditional expression is satisfied:

$$40 < vd3 < 75.$$

20. The imaging lens according to claim 11, wherein said fifth lens has an Abbe's number vd5 so that the following conditional expression is satisfied:

$$15 < vd5 < 35.$$

* * * * *